United States Patent
Nouhra et al.

(10) Patent No.: US 12,427,397 B2
(45) Date of Patent: Sep. 30, 2025

(54) SPORTS BOARDS WITH RECLAIMED STRUCTURES

(71) Applicant: SWS Sports Boards Industries LLC, Dubai (AE)

(72) Inventors: Rainier Nouhra, Dubai (AE); George Cant, Dubai (AE); John Colvin, Dubai (AE)

(73) Assignee: SWS Sports Boards Industries LLC, Dubai (AE)

( * ) Notice: Subject to any disclaimer, the term of this patent is extended or adjusted under 35 U.S.C. 154(b) by 366 days.

(21) Appl. No.: 18/109,639

(22) Filed: Feb. 14, 2023

(65) Prior Publication Data

US 2023/0277912 A1    Sep. 7, 2023

(51) Int. Cl.
*A63C 5/12*    (2006.01)
*A63C 5/056*    (2006.01)
(Continued)

(52) U.S. Cl.
CPC .............. *A63C 5/126* (2013.01); *A63C 5/056* (2013.01); *B32B 7/12* (2013.01); *B32B 37/12* (2013.01); *B32B 38/0004* (2013.01); *B32B 3/30* (2013.01); *B32B 27/302* (2013.01); *B32B 27/32* (2013.01); *B32B 27/34* (2013.01); *B32B 27/40* (2013.01); *B32B 37/18* (2013.01); *B32B 38/0012* (2013.01); *B32B 2274/00* (2013.01); *Y02W 30/50* (2015.05)

(58) Field of Classification Search
CPC ......... A53C 5/126; Y02W 30/50; B32B 37/18
See application file for complete search history.

(56) References Cited

U.S. PATENT DOCUMENTS

| | | | | |
|---|---|---|---|---|
| 5,879,103 A | * | 3/1999 | Baillie | E01F 9/629 116/63 P |
| 6,520,530 B1 | | 2/2003 | Dodge | |
| 7,246,568 B1 | * | 7/2007 | Cheung | B63B 32/57 114/357 |

FOREIGN PATENT DOCUMENTS

WO    WO-2022053582 A1 *    3/2022    ............. A63C 5/126

OTHER PUBLICATIONS

Youtube video "A Plywood Made Out of Skateboards" at https://www.youtube.com/watch?v=zAr28IAn2Vw (published May 29, 2018) (Year: 2018).*

(Continued)

*Primary Examiner* — Scott W Dodds
(74) *Attorney, Agent, or Firm* — FisherBroyles LLP

(57) ABSTRACT

A sports board incorporating reclaimed/reused sports board materials, and a method of making a such a sports board, allows for incorporation of portions of used (recycled) composite sports boards (or waste from the manufacture thereof) into new sports boards. This lessens the accumulation of composite sports board waste in the global environment, reduces the quantity of new virgin materials needed in the manufacture of new composite sports boards, and lessens the environmental impact of composite sports board manufacture and use. Optionally, the reclaimed sports board material may be incorporated into a new sports board in a manner providing structural enhancements (e.g., increased regional stiffness) to new sports boards. This may allow for structural enhancement while avoiding a significant increase in sports board weight, by incorporating used composite materials into new composite sports boards.

19 Claims, 19 Drawing Sheets

(51) Int. Cl.
  *B32B 7/12*   (2006.01)
  *B32B 37/12*  (2006.01)
  *B32B 38/00*  (2006.01)
  B32B 3/30     (2006.01)
  B32B 27/30    (2006.01)
  B32B 27/32    (2006.01)
  B32B 27/34    (2006.01)
  B32B 27/40    (2006.01)
  B32B 37/18    (2006.01)

(56) References Cited

OTHER PUBLICATIONS

IRIS Skateboards, The Original Recycled Skateboards home page, 2019, <<https://www.irisskateboards.com/>>.
Jen Q. "9 Creative Things to Do With Your Old Snowboard," The Snow Chasers Finding Adventure Everywhere, Mar. 2020, <<https://www.thesnowchasers.com/blog/9-creative-things-to-do-with-your-old-snowboard>>.
Jones, "A Second Life on Cement—Upcycling trash snowboards with NoK Skateboards," Feb. 9, 2021, <<https://www.jonessnowboards.com/content/409-from-bad-to-rad-upcycling-factory-waste-with-nok-skateboards>>.
Kish, Carl, "Niche Snowboards Interview—The World's First Recyclable Snowboard," Stoke, Jun. 5, 2017, <<https://www.stokecertified.com/niche-snowboards-interview-worlds-first-recyclable-snowboard/>>.
Semifingerboards home page, 2023, <<https://semfingerboards.com/en-us>>.

* cited by examiner

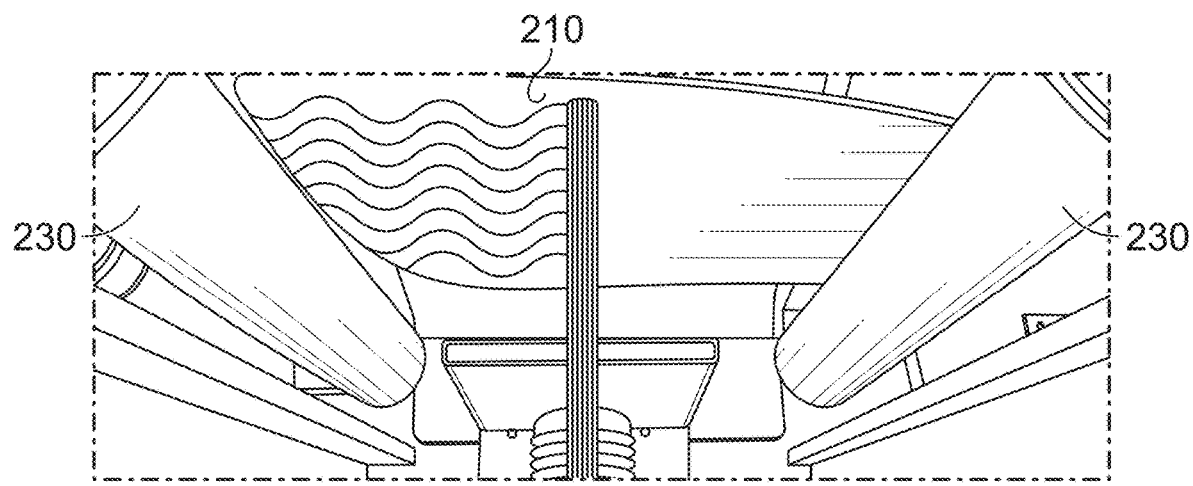
FIG. 9A
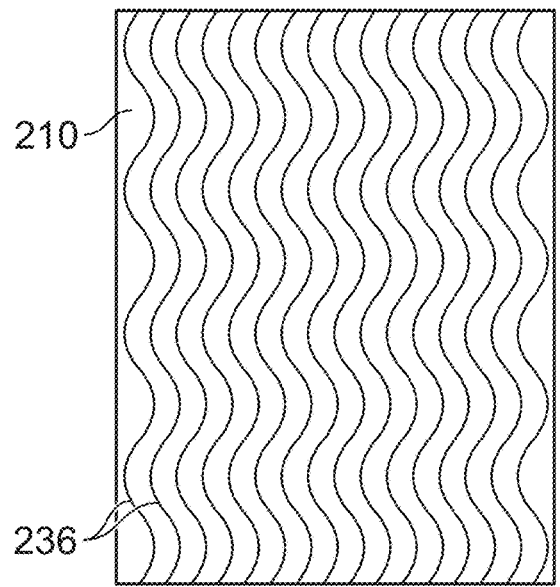 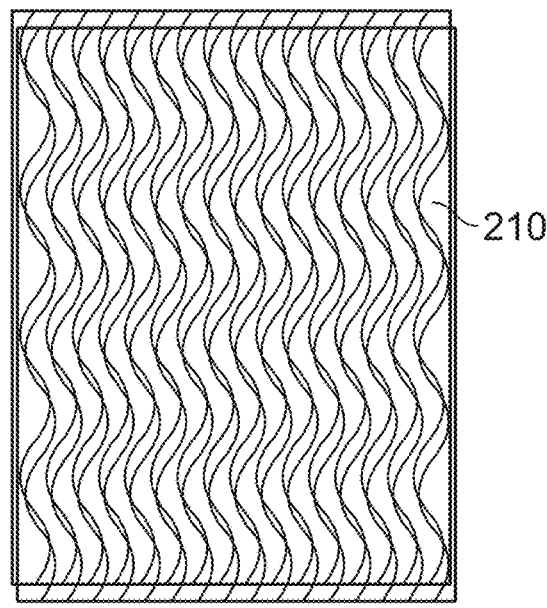
FIG. 9B  FIG. 9C

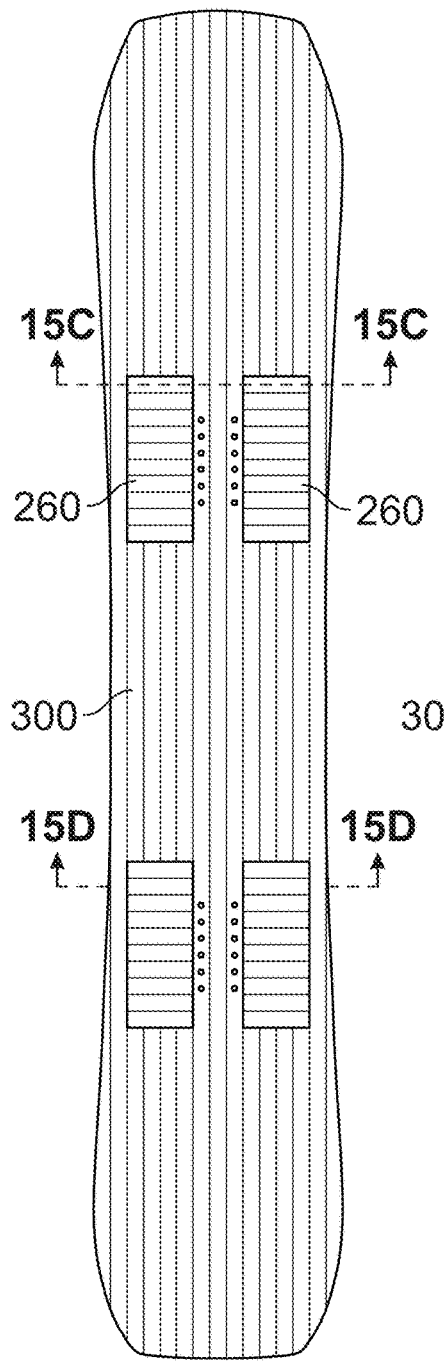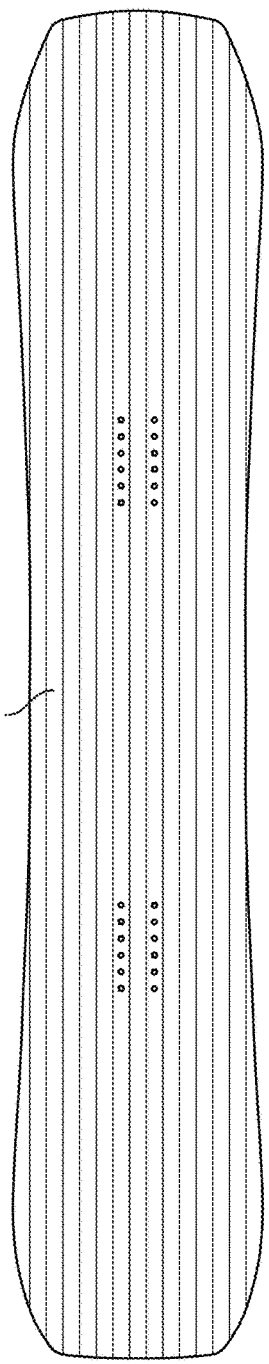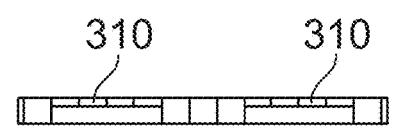
FIG. 15C
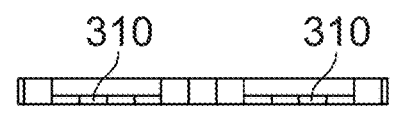
FIG. 15D
FIG. 15A   FIG. 15B

SPORTS BOARDS WITH RECLAIMED STRUCTURES

CROSS-REFERENCE TO RELATED APPLICATION

This application claims the benefit of priority, under 35 U.S.C. § 119(e), of U.S. Provisional Patent Application No. 63/315,359, filed Mar. 1, 2022, the entire disclosure of which is hereby incorporated herein by reference.

FIELD OF THE INVENTION

The present invention relates generally to composite sports boards, such as snowboards, skis, gliding boards, splitboards, kiteboards, wakeboards, and composite skateboards (all collectively referred to herein as a "sports boards" for ease of reference), and more particularly, to sports boards having reclaimed portions, sports boards having structural enhancements, and a method of manufacturing such sports boards.

DISCUSSION OF RELATED ART

Snowboards, skis, gliding boards, splitboards, kiteboards, wakeboards, composite skateboards and other composite sports boards (collectively, "sports boards") and the like are commonly manufactured in a process that involves joining together a plurality of individual layers into a unitary laminated composite sports board body.

A composite sports board is a multi-layer laminated structure made up of layers of different materials. The different materials have different material properties, in order to address strength, performance, durability, flex, aesthetics and weight. For example, such composite sports boards typically include structural fiberglass/carbon/Kevlar/etc. layers, laminated to the top and bottom side of a core (e.g., wood, foam, honeycomb, etc.) with an adhesive such as epoxy or polyurethane.

Generally, the outer layers (top and bottom) of commercially-available composite sports boards are a thin plastic sheet designed to carry the graphics/decoration (such as fiberglass or nylon), and/or is a low-friction layer (such as UHMW or HDPE polyethylene, for example), and/or has a "clear coat," none of which has material properties that are susceptible (e.g., well-suited) to forming a reliable adhesive bond because of the material properties of such surfaces. Additionally, the clear coat layer may or may not have a reliable bond to the top or base material. In the case of a snowboard, the base layer is nearly always a low friction material which is waxed by the user to increase the glide performance on the snow, making it very difficult to bond to. The surface material and surface finish of the outer layers (top and base) of these composite sports boards vary widely, but generally, they will not form a reliable bond to other layers with adhesive.

As a representative example of composite sports board manufacture, one conventional method of making snowboards uses a mold/cassette made from a relatively thick aluminum plate that has a cavity shaped to correspond to the desired finished shape of the snowboard to be manufactured. In a typical construction, a base layer of the snowboard is placed in the mold and then separate snowboard edge members (typically steel or brass) are placed in the mold at the outer perimeter, if desired. Typically, epoxy resin is then supplied into the mold (e.g., by brushing/painting on the epoxy) to wet the base layer and edge members. Layers of fiberglass (or carbon fiber, Kevlar, basalt, flax or other composite fibers) wet with resin are then laid into the mold. A core, pre-cut typically from wood, is then laid on top in the mold and more epoxy resin is supplied into the mold on the core, and then at least one more layer of fiberglass, etc. is laid on top of the core. More epoxy is then applied to the added layer(s) of fiberglass, etc., and a top sheet layer (which may have decorative graphics that will be the visible top layer of the finished snowboard) is laid on the top in the mold. The mold with the assembly of layers and epoxy resin therein is then cured in a conventional molding process that fixes the layers together in a laminated structure. By way of example, suitable conventional molding processes include a compression molding process, in which the mold is typically placed in a press under elevated temperature and pressure to cure the resin, or using an infusion or vacuum bagging process. Any suitable molding process may be used, as will be appreciated by those skilled in the art. As part of the molding process, the layers of the snowboard are often provided with a flat, 3-D camber, rocker or hybrid (combined) side profile (e.g., an upward and/or downward curve of a central portion of the snowboard, as viewed from the side), an upward curve of the nose (as viewed from the side), and/or an upward curve of the tail (as viewed from the side), etc. The molding process serves to permanently bond together the multiple individual layers of the snowboard structure, and form a unitary laminated snowboard assembly structure.

When the cured assembly is removed from the mold, the product is very rough. Additional finishing steps are typically required to form the finished snowboard product from the final snowboard assembly that exits the mold/press. The finishing process is very labor intensive. Typically, a band saw is first used to cut the fiberglass and epoxy that has squeezed out between the laminated snowboard layers. Then, many (e.g., up to twenty) sanding processes are typically used to place the base layer/bottom surface of the boards in a final finished state. This involves the removal of material from the cured assembly to compensate for local concavities and/or convexities resulting from the assembly of various parts, epoxy "squeeze-through" to the bottom surface of the snowboard, and irregularities in the layers and/or resulting from the pressing/curing process that prevent the cured board assembly from having a flat bottom surface that has a desirable level of smoothness, continuity of curvature or other shape, consistency in surface and/or thickness, etc. free from unintended local concavity, convexity and/or other irregularities resulting from the manufacturing process (collectively referred to herein as "surface consistency").

Conventional finishing equipment is designed to sand (e.g., using a sanding belt) or grind (e.g., using a grinding stone) the bottom of a board flat, as viewed in transverse cross-section, relative to a direction of elongation of the snowboard. Accordingly, there is a certain amount of loss or waste of virgin materials used to produce a snowboard (or other composite sports board) as the natural result of the sports board manufacturing process.

Additionally, composite sports boards typically have a relatively limited lifespan that is shorter than a user's typical length of participation in the sport. Accordingly, a single sports boarder or other user is likely to outlast a single sports board, and to own multiple sports boards during a span of years of participation in the sport. Sports boards may be outgrown, damaged over time, become outdated, or simply fall out of favor, with the result that many sports boards are discarded as trash, and find their way to a landfill or similar site, with a resulting loss or waste of their component materials, and an undesirable effect of additional accumulated waste in the global environment.

Further, it is recognized that sports boards may be constructed to provide desired performance characteristics, e.g., to suit various different purposes. Generally, a relatively lighter-weight sports board is desirable. In certain cases, greater sports board stiffness is desired, either over an entire sports board area, or in selected regions of the sports board. Increased stiffness often comes from the use of a greater volume of sports board materials, which undesirably increases sports board weight.

What is needed is a method of manufacturing sports boards that allows for use of used composite sports boards to lessen the accumulation of waste in the global environment, and/or that provides for structural enhancements (e.g., increased regional stiffness) while avoiding a significant increase in sports board weight.

SUMMARY

The present invention provides a sports board, and a method of making a sports board. The method of making a sports board allows for incorporation of portions of used (recycled) composite sports boards (or waste from the manufacture thereof) into new sports boards, to lessen the accumulation of composite sports board waste in the global environment, and reduce the quantity of new virgin materials needed in the manufacture of new composite sports boards, to lessen the environmental impact of composite sports board manufacture and use. Additionally, the present invention provides a method that allows for modification to provide structural enhancements (e.g., increased regional stiffness) to new sports boards while avoiding a significant increase in sports board weight, by way of incorporation of composite materials into new composite sports boards.

BRIEF DESCRIPTION OF THE FIGURES

An understanding of the following description will be facilitated by reference to the attached drawings, in which:

FIGS. 9A-9C illustrate an exemplary laser etching surface preparation process for preparing reclaimed snowboard portions for lamination to form an exemplary reclaimed block blank in accordance with the present invention;

FIGS. 15A-15D are top plan, bottom plan, and cross-sectional views, respectively, of yet another alternative exemplary core of a snowboard, showing yet another alternative exemplary incorporation of exemplary partial-depth core inserts into the exemplary core, in accordance with the present invention;

DETAILED DESCRIPTION

The present invention provides a novel method of manufacture of snowboards, skis, gliding boards, splitboards, kiteboards, wakeboards, composite skateboards and other composite sports boards (collectively referred to herein as "sports boards" in non-limiting fashion, for ease of reference only) that allows for use of used composite sports boards and/or used composite sports board materials to lessen the accumulation of waste in the global environment, and/or that provides for structural enhancements (e.g., increased regional stiffness) while avoiding a significant increase in sports board weight.

Figure 1:
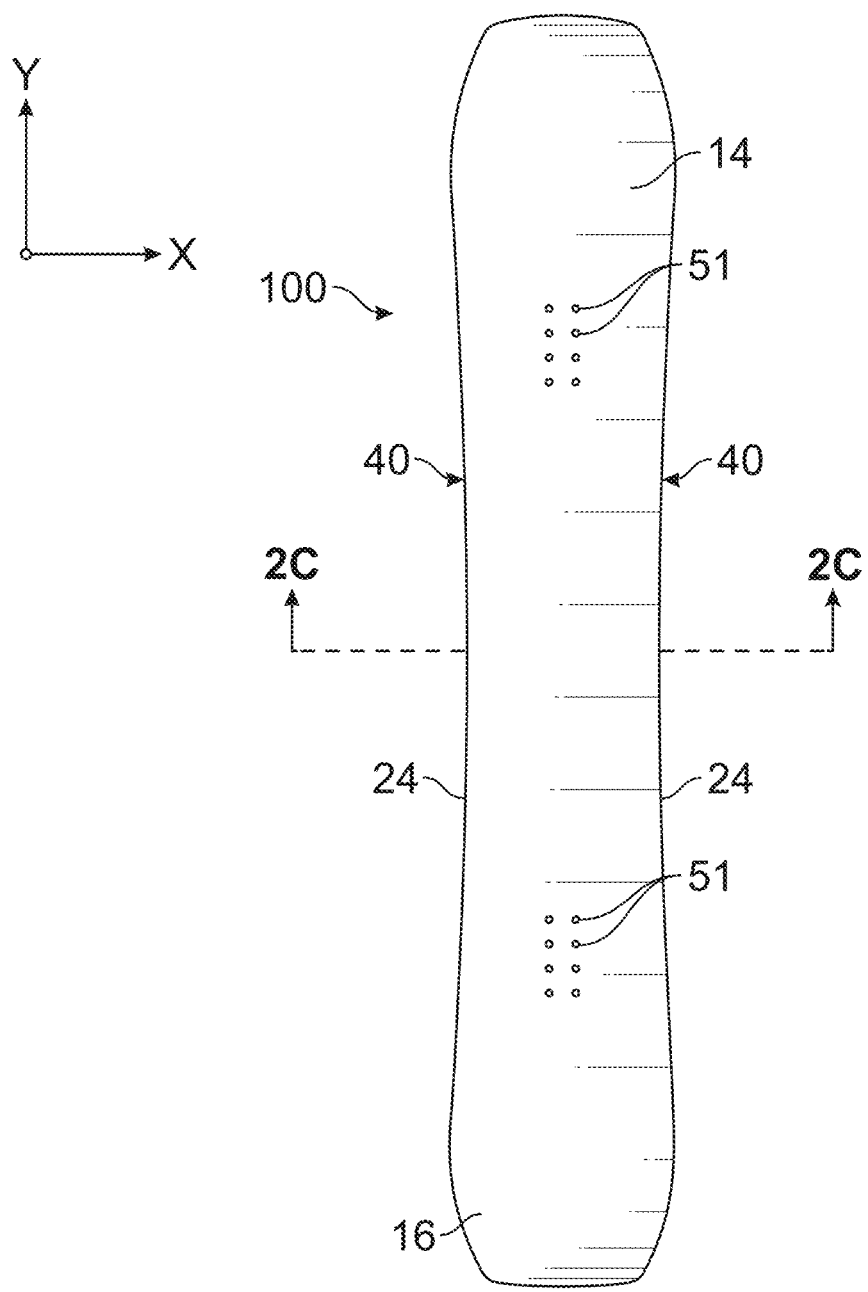
FIG. 1 is a top plan view of an exemplary sports board (snowboard) constructed to include core panel inserts in accordance with an exemplary embodiment of the present invention.
Figure 2A:
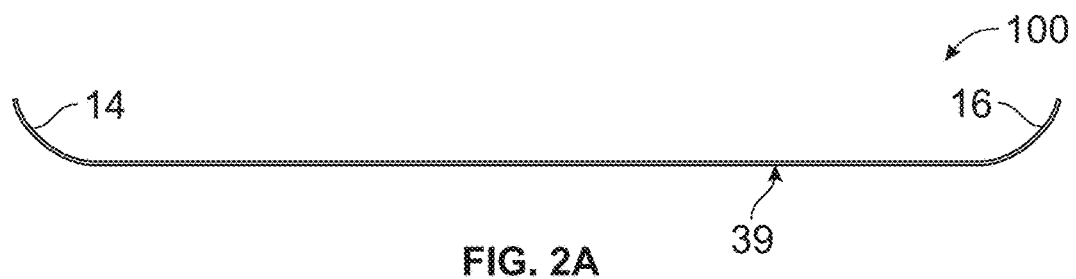
FIGS. 2A and 2B are side and rear views, respectively of the exemplary snowboard of FIG. 1.
Figure 2B:
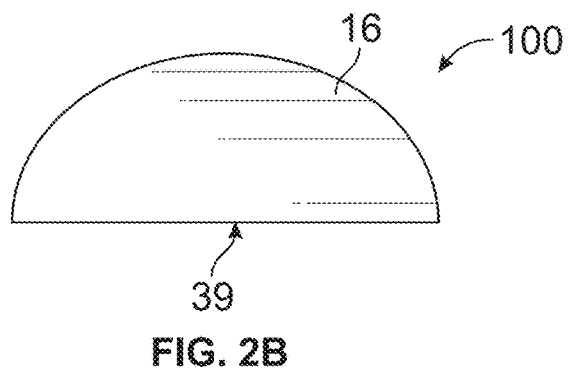
Figure 2C:
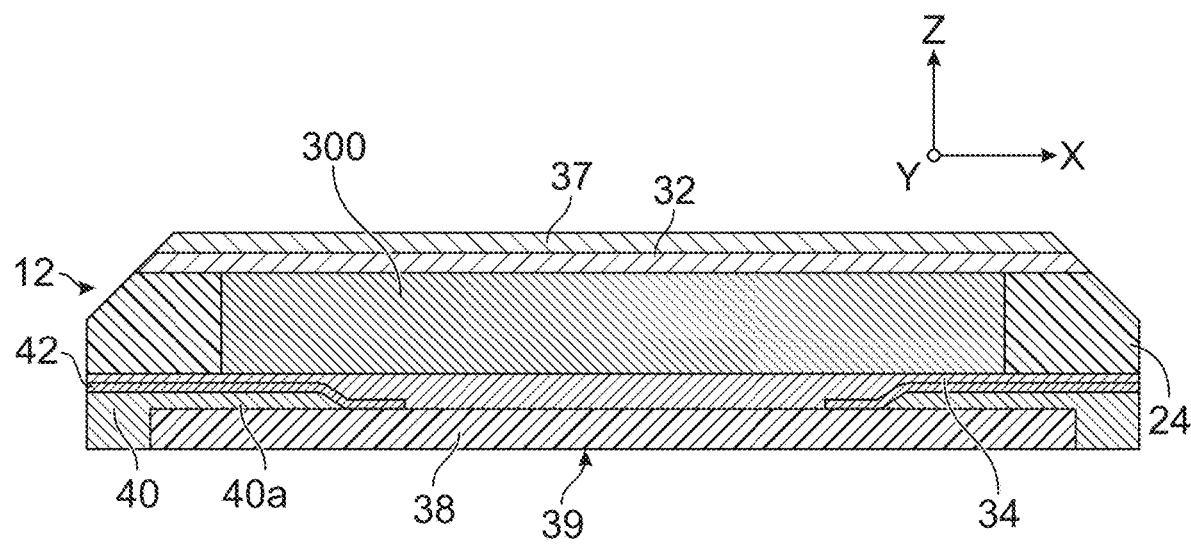
FIG. 2C is a transverse cross-section, taken along line 2C-2C of FIG. 1.

Referring now to FIGS. 1-2C, an exemplary snowboard-type sports board 100 constructed in accordance with an exemplary embodiment of the present invention is shown. In certain respects, the exemplary snowboard 100 has a generally conventional construction, in that it has a body that is elongated in the longitudinal direction (Y-direction, as shown in FIG. 1), and has a central portion 12, nose portion 14 and a tail portion 16. The snowboard may bend in the longitudinal direction, e.g., to provide a camber, rocker, or hybrid profile, and/or in the transverse direction.

Further, consistent with conventional snowboard construction, the snowboard 100 includes an outer edge 40, which may be constructed of steel, brass, etc., as known in the art. Longitudinally-extending portions of the outer edge 40 are defined at least along each side of the central section 12 of the board. Further still, consistent with conventional snowboard construction, the snowboard 100 includes a core 300, which may be constructed of wood, polyurethane foam or other known core materials. The exemplary core 300 extends the full width of the snowboard except for the width of the sidewall members 24.

Further still, consistent with conventional snowboard construction, the core 300 is sandwiched between top and bottom reinforcement layers 32, 34, which abut the upper and lower surfaces of the core 300 and become impregnated with adhesive that is cured during manufacture to provide structural reinforcement to the core 300 and finished snowboard 100, as known in the art. The top and bottom reinforcement layers 32, 34 may be constructed of any conventional material used for this purpose, such as fiberglass, graphite or Kevlar/carbon fibers arranged in a fabric or mat (such as a 700 gsm biaxial fiberglass mat). Further still, consistent with conventional snowboard construction, the top reinforcement layer 32 is overlain by a top sheet 37, which is typically imprinted or otherwise provided with decorative graphics that provide the finished snowboard product with its desired finished appearance. The top sheet 37 may be formed of any conventional material known for use for this purpose, such as a polyethylene, urethane, acrylic, Nylon™/polyamide, polybutylene terephthalate, ABS/TPU, a wood veneer, a separate and additional pre-cured fiberglass layer, the top reinforcement layer itself acting as a top sheet, a titanal/aluminum alloy material layer, etc. Accordingly, in some embodiments, a separate/additional top sheet layer may be excluded from the finished snowboard. In any event, the finished snowboard includes a plurality of layers permanently bonded together into a unitary lamination.

Still further, consistent with conventional snowboard construction, the snowboard 100 further includes a base layer 38. The base layer 38 has a lower surface 39 that is the running surface that abuts the snow, ground, etc., and thus is typically formed of a durable low-friction material, an example of which include ultra-high molecular weight polyethylene. The base layer 38 may be formed of any suitable material, such as polyethylene or other materials preferred of their low-friction properties. As known in the art, the base layer 38 may be made from a transparent material that can be printed (screen printed, sublimated or direct digital printed, e.g., on the bonding side) to add graphics. Further, the base layer 39 may be die-cut with different colored or printed base material pieces insert into the die-cut areas to create an inlaid graphic/design. This latter configuration in particular is susceptible to adhesive migrating through the joints between the pieces in the layer, and the parts may have different thickness and/or sit out of plane/not flush, which creates an uneven bottom surface particularly in need of sanding/grinding after pressing/curing, to provide a desirably consistent bottom surface.

This exemplary embodiment has a base surface 39 that is flat (i.e., generally visibly flat as described above, without significant and/or deliberate convex or concave curvature, or other intended non-flat profile in the vertical/Z-direction) in a direction transverse to the direction of elongation (the X-direction, as shown in FIG. 1), as known in the art, and as best shown in FIGS. 2B and 2C. It will be appreciated that in other embodiments, the base surface 39 may be non-flat, and thus may have significant and/or deliberate convex or concave curvature, or another intended non-flat profile in the vertical/Z-direction (in a direction transverse to the direction of elongation, namely, the X-direction, as shown in FIG. 1).

In accordance with the present invention, the snowboard includes at least one core insert. Preferably, the core insert is included in the core 300 layer of the snowboard, at least in part, although the core insert may be incorporated into and/or span other layers. In certain embodiments, the core insert is disposed selectively to provide a desired structural enhancement, e.g., to increase or decrease the stiffness or other properties of the core 300 and resulting snowboard 100 including the core, and/or to provide a desired appearance. In certain embodiments, the core insert is formed from reclaimed snowboard materials, e.g., in accordance with the reclamation method described herein. In certain embodiments, the core insert is formed as a multi-layer lamination and is disposed in the core 300 to have its lamination direction oriented transversely to that of a lamination direction of the remainder of the layers of the snowboard 100, e.g., to provide a stiffening effect in the region of the core insert. Notably, the stiffening (or other) effect associated with the core insert may be provided only in a regional/localized area (namely the region/area of the core insert) such that the material properties of the sports board/core associated with the material properties in the region of the core insert (because of the different materials and/or layer orientation) are different from those of the area/region (e.g. in the same layer) adjacent the core insert, to provide for highly-selectable/highly-tunable core and/or sports board properties, performance and/or effects.

As referred to above, materials other than reclaimed snowboard materials may be used as core inserts and be incorporated into new snowboards in accordance with the present invention. Preferably, however, core inserts are constructed from reclaimed sports board material to reduce environmental waste and reduce the need for virgin materials in producing new sports boards, and to reduce the overall carbon footprint for sports board products. A method for reclaiming sports board materials from used/existing sports boards so they may be used in producing new sports boards is described below with reference to FIGS. 3-15.

Figure 3:
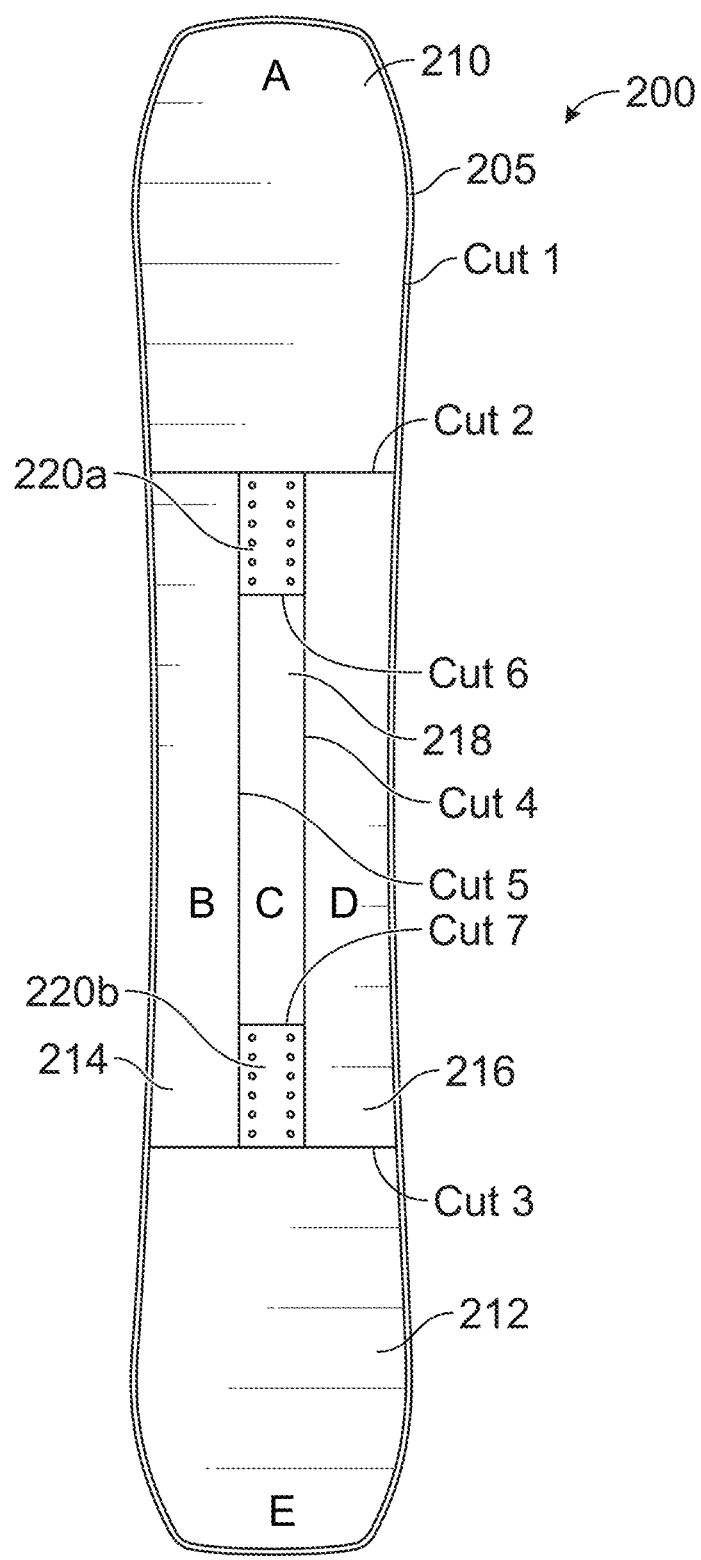
FIG. 3 is a top plan view of an exemplary used snowboard showing exemplary cut lines for material reclamation purposes in accordance with an exemplary embodiment of the present invention.

Referring now to FIG. 3, an exemplary used snowboard-type sports board 200 is shown. The snowboard may be of any conventional construction. As is typical of many snowboards per se, the exemplary used snowboard 200 includes internal layers that may include one or more of wood, fiberglass, carbon fiber and other materials typically used in snowboards bonded to and sandwiched between a low friction base layer on the bottom (such as polyethylene), and a durable, often decorative, top sheet on the top (such as a nylon top sheet), and often between edges typically made of metal (or alternatively, of carbon fiber, fiberglass, ceramic materials, etc.). Not all of these materials and/or components are well-suited for reclamation and re-used, at least substantially in their current form, which poses problems associated with reclamation, such as how to incorporate reclaimed materials into a new snowboard with reliable bonding providing a reliable snowboard structured as an integral unit. These problems are addressed by the reclamation method described herein.

The exemplary method involves gathering a plurality of sports boards (which may be gliding boards, such as snowboards, skis, splitboards, kiteboards, wakeboards, composite skateboards and other composite sports boards). It may be advantageous to process similar types of sports boards together as a set. From each of a set of sports boards, the method involves removing the edges from each sports board, if they include edges. Referring again to FIG. 3, an exemplary first cut (Cut Line 1) around a periphery of the used sports board 200, to remove metal and/or plastic edge components 205, is shown. In other embodiments, new/virgin materials may be used to form core inserts as substitutes for the plurality of sports boards, although in such embodiments waste may not be avoided and materials may not be reused as is the case in other embodiments.

Next, the exemplary method involves cutting each of one or more sports boards into one or more slabs. Preferably, the cuts are organized so that one or more slabs of similar sizes and shapes can be gathered from one or more sports boards, such that sets of slabs of similar size and shape can be matched together and laminated to form a block blank that can then be used as sheet stock for creating core inserts that can be incorporated into the cores of new sports boards, as discussed in greater detail below. Referring again to FIG. 3, exemplary second and third cuts (Cut Lines 2 and 3) separate the nose (A) and tail (E) portions from a central portion of the sports board 200. One or both of the nose and tail slabs 210, 212 may be curved in the longitudinal or other directions, and it may be advantageous, for example, to group nose slabs from more than one sports board, or nose slabs and tail slabs from more than one sports board, to form a single reclaimed block blank, depending upon their three-dimensional sizes/shapes.

Referring again to FIG. 3, exemplary fourth and fifth cuts (Cut Lines 4 and 5) separate the lateral portions (B) and (D) from a central portion (C) of a remaining portion of the sports board 200. It may be advantageous, for example, to group lateral portion slabs 214, 216 from one or more sports boards to form a single reclaimed block blank, depending upon their three-dimensional sizes/shapes.

Referring again to FIG. 3, exemplary sixth and seventh cuts (Cut Lines 6 and 7) separate the binding insert portions from a central portion (C) of a remaining portion of the sports board 200. The inserts are typically metal and may be recycled or reused, and the binding insert portions 220a, 220b may be discarded. It may be advantageous, for example, to group central portion slabs 218 from more than one sports board to form a single reclaimed block blank, depending upon their three-dimensional sizes/shapes.

Figures 4A, 4B, 5A:
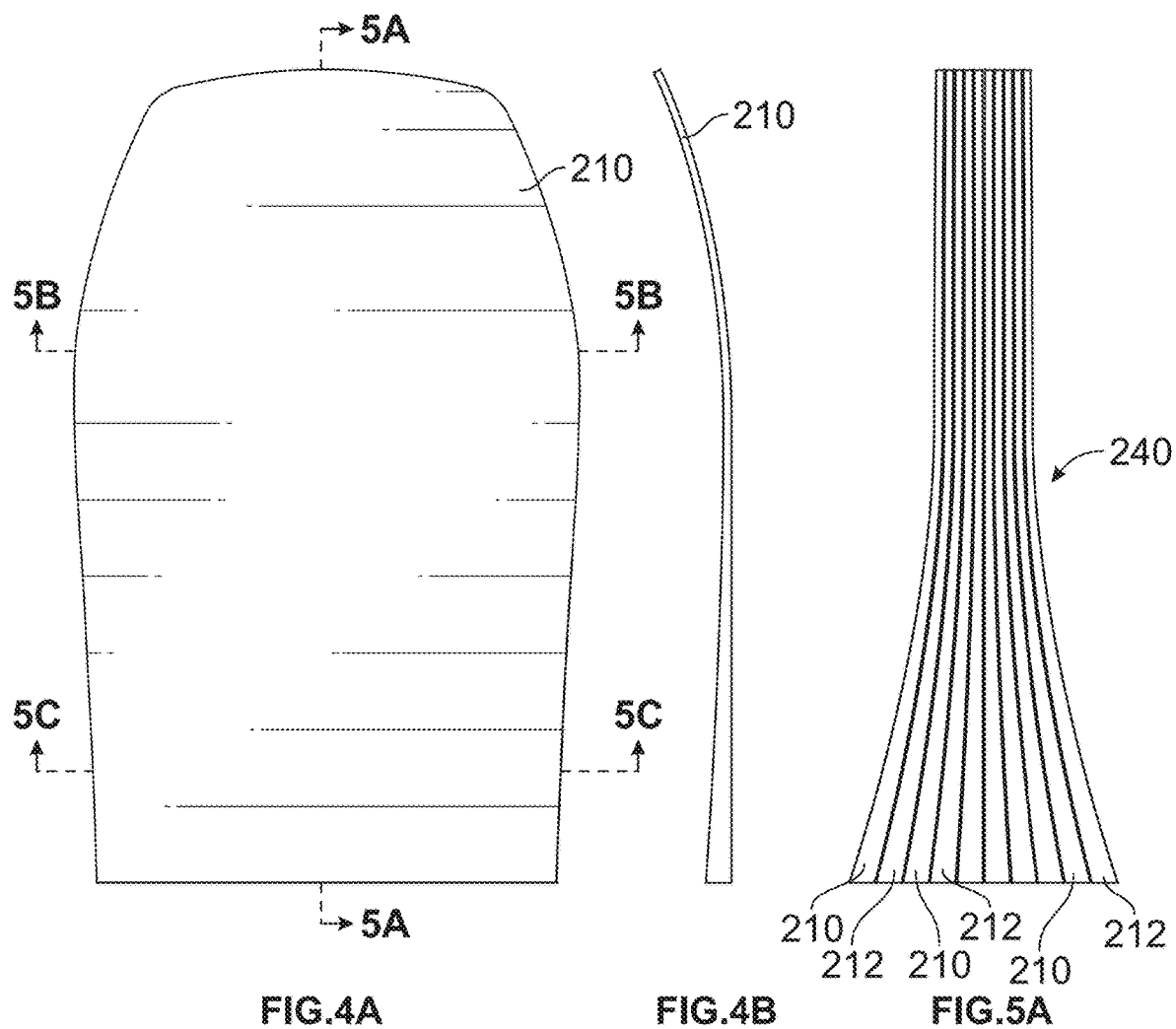
FIGS. 4A and 4B are top plan and side views, respectively, of an exemplary nose or tail portion of the snowboard of FIG. 3.
FIGS. 5A-5C illustrate an exemplary lamination of plurality of snowboard portions of FIG. 4A to form an exemplary reclaimed block blank in accordance with the present invention.
Figure 5B:
Figure 5C:
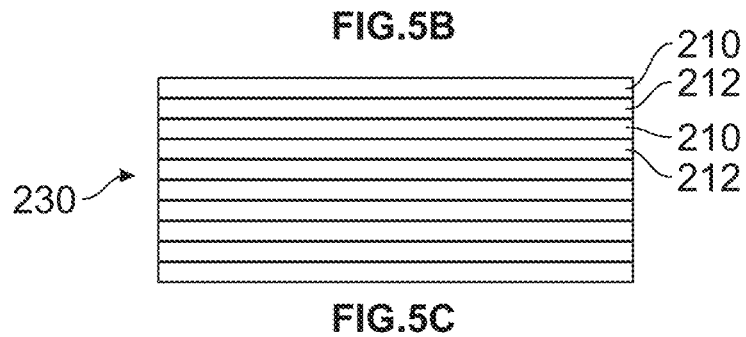

FIGS. 4A and 4B are top plan and side views, respectively, of an exemplary nose slab 210 (or tail slab 212) of the used sports board 200 of FIG. 3. FIGS. 5A-5C illustrate an exemplary lamination of plurality of sports board nose slabs 210 and tail slabs 212 to form an exemplary reclaimed block blank 240 in accordance with the present invention. FIG. 5A is a cross-sectional view taken along a line corresponding to the orientation of line 5A-5A of FIG. 4A. FIG. 5B is a cross-sectional view taken along a line corresponding to the orientation of line 5B-5B of FIG. 4A. FIG. 5A is a cross-sectional view taken along a line corresponding to the orientation of line 5C-5C of FIG. 4A. It should be appreciated that reclaimed block blanks may be formed by laminating any combination of slabs, or by including slabs in any lamination.

It should be noted, however, that FIGS. 5A-5C are for illustrative purposes only, and that due to the nature of the materials of typical sports boards, and that the applicant has found that reliable block blanks cannot be formed satisfactorily from used sports boards by simply spreading epoxy resin (or polyurethane glue, or any other suitable adhesive, hereinafter referred to collectively in non-limiting fashion as "adhesive") between slabs and placing them in a press to cure, as may be suitable for other materials having material properties different from those of the materials used for the outer layers (base layer and top sheet layer) of sports boards, which are not readily or reliably bondable to each other with conventional epoxies or other adhesives typically used in the sports board industry, due to the material properties of those layers. Accordingly, the present invention includes performing a surface preparation process prior to the lamination step to treat at least one outer surface of a reclaimed sports board slab prior to lamination into a reclaimed block blank.

Further, it should be noted that the discussion in the example above describes creation of block blanks for insertion into finished boards by cutting each of a plurality of sports boards to form at least one slab, stacking the slabs in a first lamination direction (with a layer of adhesive between adjacent slabs), and curing the adhesive to laminate the slabs to form a block blank comprising a plurality of slabs (and layers) bonded together in the first lamination direction. However, this is exemplary only, and other steps for creation of the block blanks may be employed. By way of alternative example, the block blanks may be created by stacking composite sports boards with adhesive disposed in between, curing the adhesive to laminate the composite sports boards, and then cutting the plurality of composite sports boards bonded with cured adhesive to form the block blanks, such that the block blanks comprises a similar finished block blank with a similar plurality of layers bonded together in the first lamination direction.

Figure 6A:
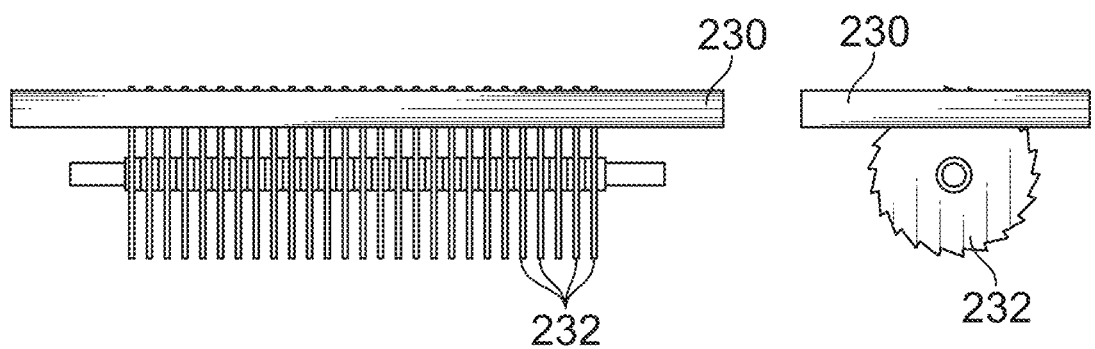
FIGS. 6A-6B illustrate an exemplary gang sawing surface preparation process for preparing reclaimed snowboard portions for lamination to form an exemplary reclaimed block blank in accordance with the present invention.
Figure 6B:
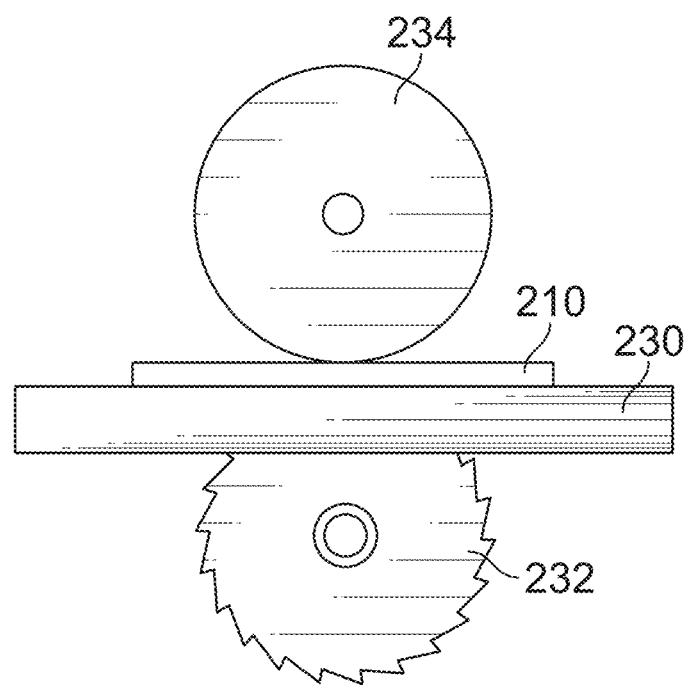

FIGS. 6A-6B illustrate an exemplary mechanical trenching surface preparation process for preparing reclaimed composite sports board slabs for lamination to form an exemplary reclaimed block blank. In accordance with the mechanical trenching surface preparation process, a reclaimed sports board slab, e.g. 210, 212, 214, 216, 218 is processed to form trenches to mechanically disrupt the surface of the slab, to cut through the outer layers less susceptible to forming a reliable adhesive bond, to expose inner layers of the slab that are more susceptible to forming a reliable adhesive bond, and to increase the overall surface area available for adhesive bonding. The mechanical trenching may be performed in any suitable manner. In the example of FIGS. 6A-6B, a sawing mechanical trenching process is illustrated. In this process, a slab may be placed on a table 230 of a table saw or similar equipment adjusted to expose at least one circular saw blade 232 above the table, to form a cut through the outer layer (base layer 38 and/or top sheet 37) of the slab 210. In the example shown, a gang sawing arrangement is shown in which a plurality of circular saw blades 232 are supported in a (side-by-side) ganged arrangement. In such an arrangement, a single pass of the slab beneath a feed wheel 234 and over the table 230 and gang of saw blades 232 forms a plurality of trenches 236 concurrently in the surface of the slab 210, as will be appreciated from FIGS. 7A and 7B.

In some embodiments, it may be sufficient to cut through the outermost layer only, in order to prepare the composite sports board material for making a reliable adhesive bond. In other embodiments, it may be necessary or advisable to cut through more than just the outermost layer, in order to prepare the composite sports board material for making a reliable adhesive bond. For example, in the case of a composite sports board that has a clearcoat on top of the top sheet, it may be sufficient for the cut/trench to penetrate through the clear coat and also the top sheet material, to expose the fiberglass layer below. In other embodiments, the cut/trench may extend through an outer layer, fiberglass layer and into a core material/layer.

Composite board construction and layer thickness may vary, especially if different used composite sports boards from different manufacturers are used to prepare slabs, block blanks and core inserts. Top sheet layers may have a thickness of approximately 0.4 mm and fiberglass layers and base material layers may have thicknesses of approximately 1 mm. It may be desirable, e.g., when using a mechanical trenching process, to use a relatively deeper repeatable cut depth intended to cut through multiple layers, regardless of the board's construction. Though trenches extending through only a single material layer is shown for illustrative purposes, it will be appreciated that the cut/trench may extend through multiple material layers. A cut depth of about 0.5 mm-1.5 mm may be suitable for this purpose.

In some cases, no cuts may be necessary in order to prepare the reclaimed sports board material for making a reliable adhesive bond. For example, a sports board made with a fiberglass layer as the top sheet may just need to be sanded in order to achieve a reliable bond. A wakeboard may be built in this way, with the fiberglass layer being the top and base, while a snowboard will almost exclusively have a base layer made of polyethylene.

Additionally, old/used composite sports boards may have become contaminated and may be less susceptible to forming reliable adhesive bonds. Contamination may be from wax being used on the base of a snowboard (e.g., to improve the glide), stickers (containing adhesives) being applied to the surfaces of the boards, oils, and dirt/dust, etc. from use, wear and tear, and/or storage. In some cases, top sheets and base materials are only treated for bonding on one side (the bonding side) by the raw material suppliers. This means that adhesives like epoxy or PU will not form a reliable bond on the untreated surface even if an underlying material might itself be susceptible to forming a reliable bond.

It will be appreciated that any suitable mechanical trenching process and any suitable equipment may be used to form trenches 236 in slabs consistent with the present invention. By way of alternative examples, one or more routers with slot-cutting or other router bits may be used to form one or more trenches, angle griding cutting wheels, a planer with slotted cutting blades, scrapers, heated blades, a low-pressure waterjet, sand blasting, bead blasting, a rotary disc with an eccentrically-located cutter, etc. may be used. Other trenching processes may also be used.

Figure 7A:
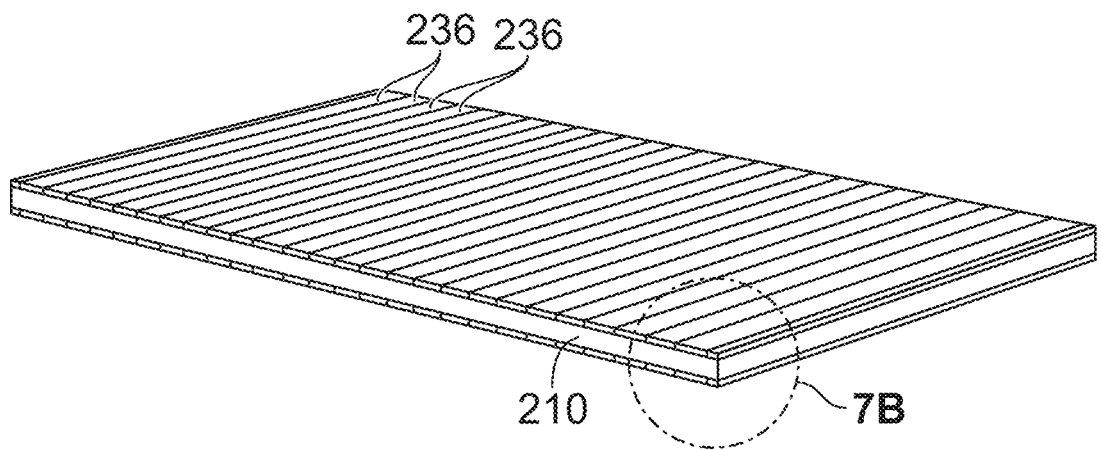
FIGS. 7A-7B are perspective and enlarged views, respectively, of an exemplary prepared reclaimed snowboard portion prepared by the exemplary gang sawing surface preparation process of FIGS. 6A-6B.
Figure 7B:
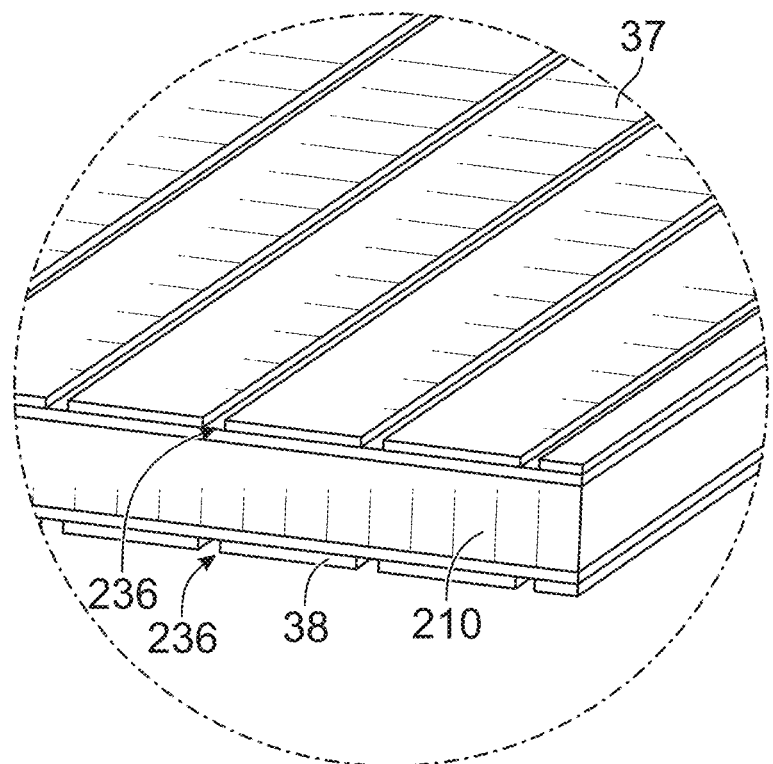
Figure 8A:
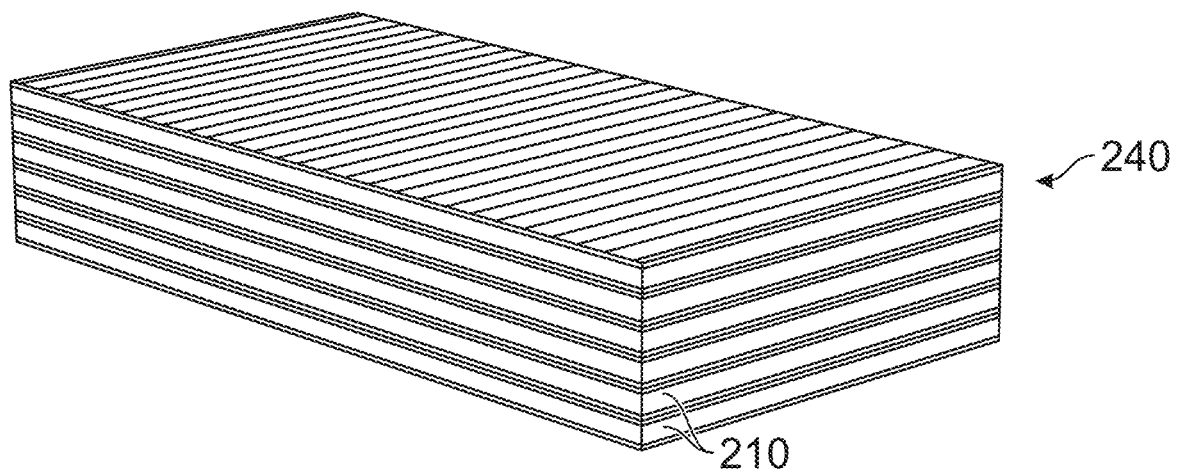
FIGS. 8A-8B are perspective and enlarged side views, respectively, of a plurality of exemplary prepared reclaimed snowboard portions of FIGS. 7A-7B, shown positioned abutted against one another to form an exemplary reclaimed block blank in accordance with the present invention.
Figure 8B:
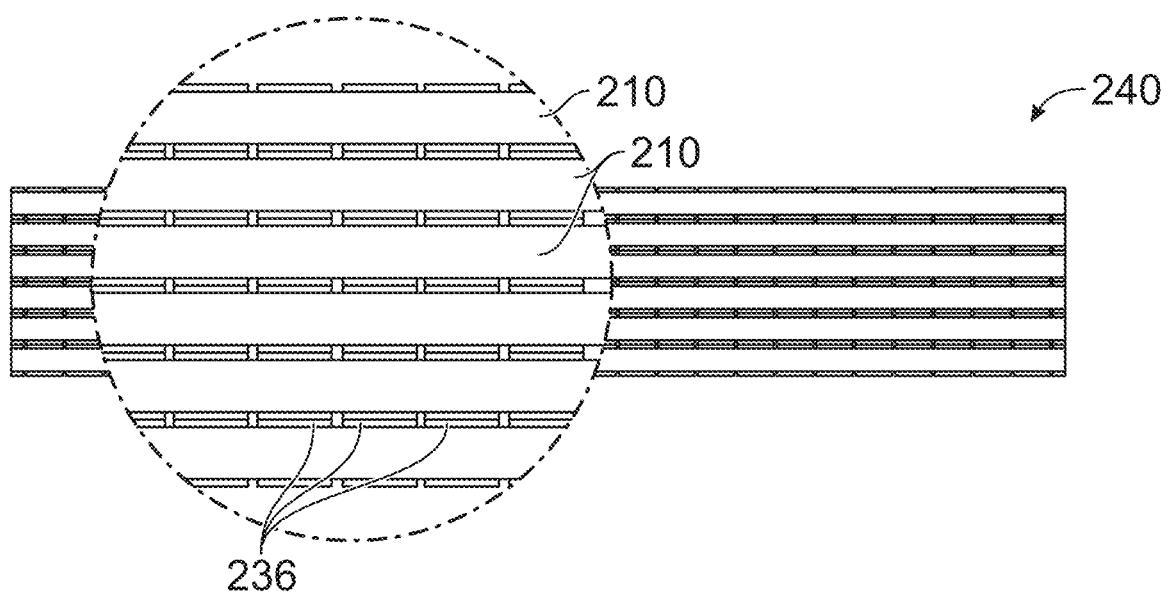

FIGS. 8A-8B are perspective and enlarged side views, respectively, of a plurality of exemplary prepared reclaimed sports board slabs 210 of FIGS. 7A-7B, shown positioned abutted against one another to form an exemplary reclaimed block blank 240 in accordance with the present invention (adhesive between the slabs 210 and filling the trenches 236 is omitted here for illustrative clarity).

FIGS. 9A-9C illustrate an exemplary laser etching surface preparation process for preparing reclaimed sports board slabs for lamination to form an exemplary reclaimed block blank. In accordance with the laser etching surface preparation process, a reclaimed sports board slab, e.g. 210, 212, 214, 216, 218 is processed to form trenches to mechanical disrupt the surface of the slab, to cut through the outer layers less susceptible to forming a reliable adhesive bond, to expose inner layers of the slab that are more susceptible to forming a reliable adhesive bond, and to increase the overall surface area available for adhesive bonding. The laser etching may be performed in any suitable manner. In this exemplary laser etching process, a slab 210 may be placed on a table 230 of laser etching or similar equipment, with the laser power adjusted to penetrate the outer layer (base layer 38 and/or top sheet 37) of the slab 210 and form one or more trenches. In the example shown in FIG. 9B, it is illustrated that the trenches formed in this manner may be non-linear, which may be advantageous in providing sufficient overlap/matching of facing trenches 236 of adjacent slabs when trenches in adjacent slab are not precisely aligned, e.g., due to mismatch, irregularities in size, or movement during lamination, as illustrated in FIG. 9C. A trench depth of about 0.5 mm-1.5 mm may be suitable for this purpose.

It will be appreciated that any other surface preparation processes may be used to prepare the slabs for lamination and suitable adhesive bonding. For example, a belt sanding or other sanding or grinding process, using conventional equipment, may be used to remove wax from the base or otherwise add irregular texture to the surfaces of the base layer and top sheet layer to promote reliable adhesive bonding. As an alternative example, a corona treatment process, using conventional equipment, may be used to increase the surface energy of the surfaces of the base layer and top sheet to promote reliable adhesive bonding. As another alternative example, a flame treatment process, using conventional equipment, may be used to remove oils/wax and promote reliable adhesive bonding. Alternatively, acid etching of the surfaces or sand blasting (especially if an aluminum skin has been used as a top sheet) may be used for this purpose.

In certain embodiments a combination of one or more of the above-described surface preparation processes may be used to prepare slabs for adhesive-based lamination. For example, an exemplary surface preparation process may involve belt grinding each slab to remove residual wax on the base layer, then passing the top sheet and base layer of the slabs over a gang saw to create trenches on both sides, and then flame treating the top sheet and base layer of each slab to remove any oils and contamination, prior to application of adhesive, between slabs, layering the slabs, and placing the adhesive-laden set of slabs in a press for application of heat and/or pressure to cure the assembly into a reclaimed block blank.

Figure 10A:
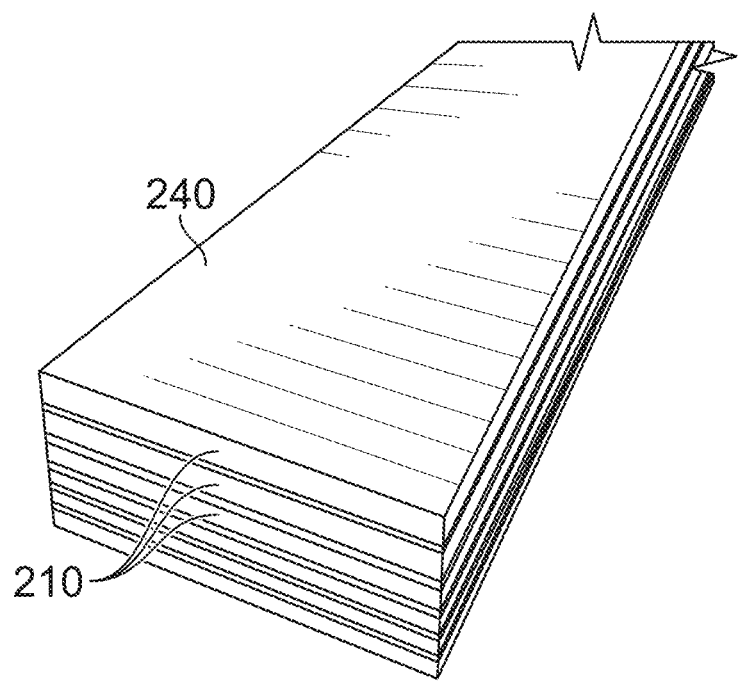
FIG. 10A is a perspective view of an exemplary reclaimed block blank formed in accordance with the present invention.

After the reclaimed slabs have been prepared using a suitable surface preparation process, the method involves joining multiple surface-treated slabs together in a lamination process to form a reclaimed block blank. This involves gathering together a plurality of slabs in a stacked or abutting arrangement with a layer of adhesive spread between each pair of adjacent slabs. The assembly of surface-prepared slabs with adhesive therein is then cured in a conventional lamination process that fixes the layers together in a laminated structure. By way of example, a suitable conventional lamination process includes a compression process, in which the assembly is typically placed in a press under elevated pressure and/or temperature to cure the adhesive. Any suitable lamination process may be used, as will be appreciated by those skilled in the art. FIG. 10A is a perspective view of an exemplary reclaimed block blank 240 formed in accordance with the present invention to include 6 reclaimed slabs from used sports boards stacked in a vertical direction (as shown in FIG. 10A) joined together by cured adhesive.

Figure 10B:
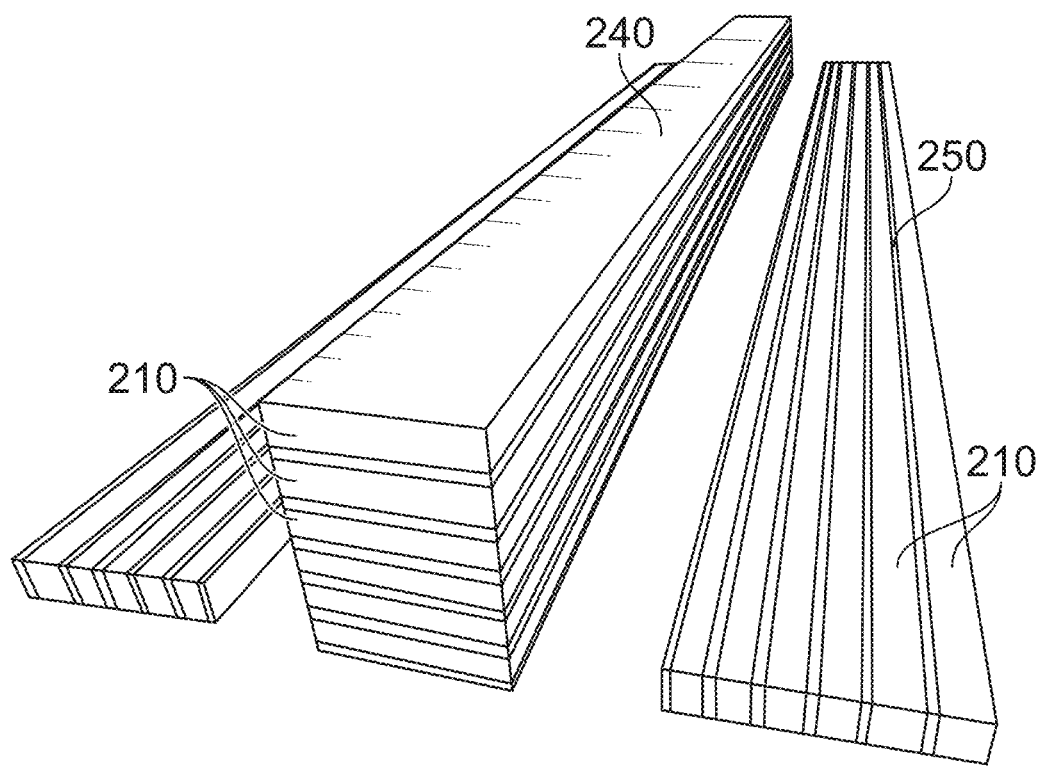
FIG. 10B is a perspective view of an exemplary reclaimed core panel formed in accordance with the present invention.

After multiple slabs have been joined together in a lamination process to form a reclaimed block blank, the method involves cutting the reclaimed block blank 240 to form a core panel 250. Although the cutting may be performed in any desired direction, the cutting is preferably performed in the same direction as the lamination, e.g., vertically in FIGS. 10A and 10B, so that the cut passes through multiple slabs of the reclaimed block blank 240, so that the core panel 250 is itself a lamination of multiple portions (e.g., slabs 210) of the reclaimed materials. FIG. 10B is a perspective view of an exemplary reclaimed core panel 250 formed in accordance with the present invention by cutting the core panel 250 from the reclaimed block blank 240 of FIG. 10A. The cutting may be performed in any suitable manner, e.g. via a band saw, a table saw, a reciprocating saw, a gang of reciprocating saw blades, a waterjet cutting machine, a router, etc. In this manner, it includes material of different materials having different material properties (such as a wood core, biaxial and/or triaxial fiberglass and/or carbon fiber fabrics, etc.).

Figure 11:
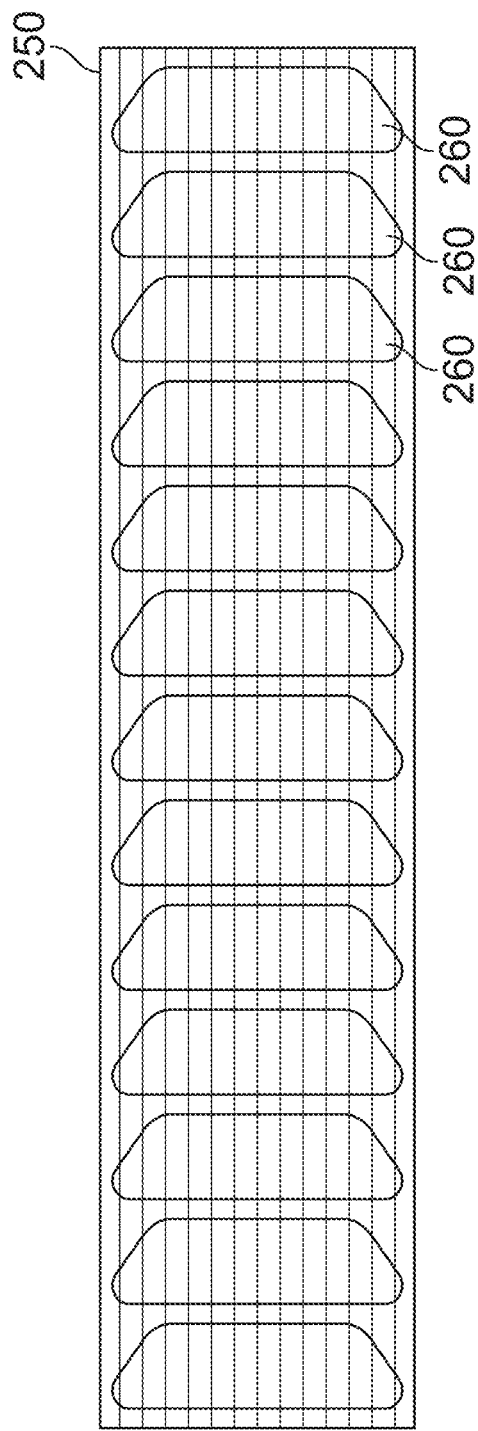
FIG. 11 is a top plan view of an exemplary reclaimed core panel, showing how exemplary core inserts may be formed from the reclaimed core panel in accordance with the present invention.

After the reclaimed block blank 240 has been cut to form a core panel 250, the method involves cutting core inserts 260 from the core panel 250. It should be noted that multiple core inserts can likely be cut from a single core panel 250. FIG. 11 is a top plan view of an exemplary core panel 250, showing an example of how core inserts 260 may be laid out and cut from the core panel. In this example, the core inserts 260 are laid out to be elongated in the same direction as the lamination of the layers of the core panel 260 (both vertically, as shown in FIG. 11). Core inserts 260 of various sizes, shapes, layout/orientation etc. may be obtained, as desired. The cutting may be performed in any suitable manner, e.g., via a band saw, a CNC or other router, a table saw, a waterjet cutting machine, a laser cutting machine, a jigsaw/reciprocating saw, etc. As will be appreciated by those skilled in the art, the size and shape may be varied according to desired placement in the board core 300 and/or according to desired material properties, performance characteristics and/or visual appearances.

Figure 12:
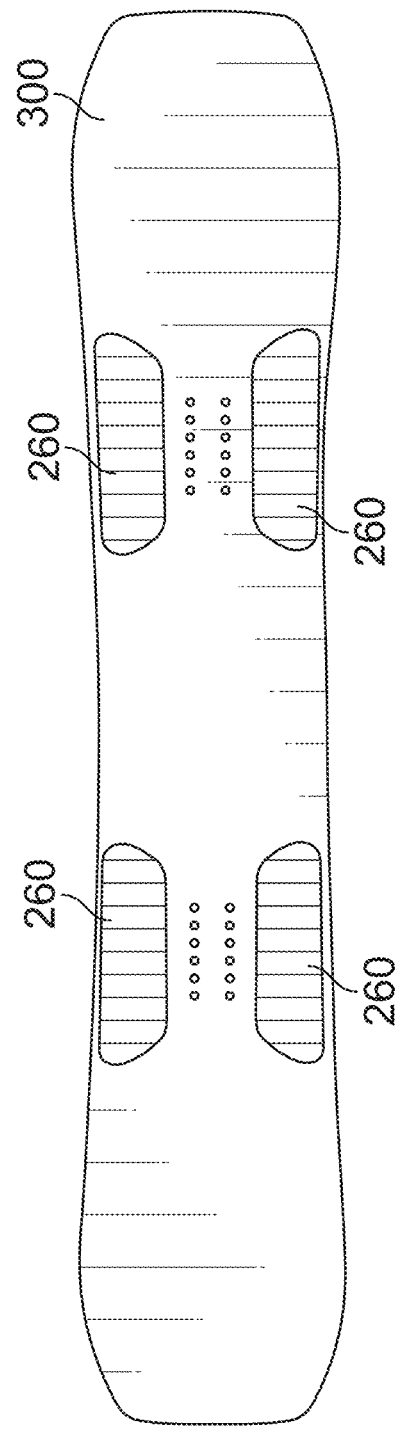
FIG. 12 is a top plan view of an exemplary core of a snowboard, showing an exemplary incorporation of the exemplary core inserts of FIG. 11 into the exemplary core, in accordance with the present invention.

After the core inserts 260 have been cut from the core panel 250, the method involves incorporating the core inserts into the sports board (e.g., core 300 in this example). FIG. 12 is a top plan view of an exemplary core 300 in accordance with the present invention. In accordance with the present invention, the core 300 includes core inserts 260 having material properties different from that of a remainder of the core 300. In this example, the core inserts 260 are disposed in the region of the bindings, outside of the binding insert regions, and between each binding insert region and an adjacent edge of the sports board, which is an area of the sports board in which increased stiffness is often desired, as it contributes to enhanced sports board performance by increasing power transmission from the rider to the edge of the sports board. Additionally, this arrangement can create a series of vertical composite ribs and perhaps end grain wood (if desired) which makes the core insert area very resistant to denting and impact from the binding base plate. Of particular note, the vertical laminations of the fiberglass (and other layers) in the exemplary block blank 240 (as shown in FIG. 10A) that produce the exemplary core panel 250 and core insert 260 result in a particularly stiff core insert when the core insert 260 is incorporated into the core 300, with the lamination direction extending horizontally relative to the sports board/core 300 (and thus the individual layers of the core insert extending vertically), and with the lamination direction aligned with the direction of elongation of the core 300 (as shown in FIG. 12). In this orientation, the core inserts 260, provide a stiffening effect (from the insert regions toward the edges) somewhat like that of an I-beam, delivering increased stiffness and resulting functional performance characteristics and strength, without the need for adding new virgin materials to the new board.

Figure 13A:
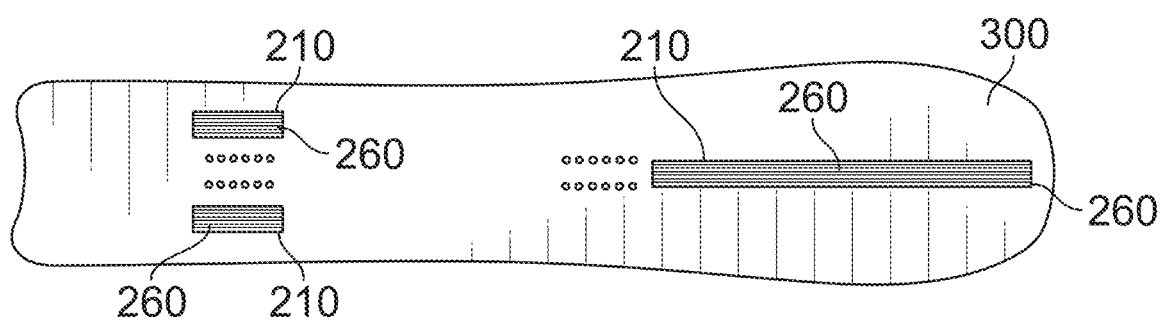
FIGS. 13A-13C are top plan and perspective views of an alternative exemplary core of a snowboard, showing an alternative exemplary incorporation of exemplary core inserts into the exemplary core, in accordance with the present invention.
Figure 13B:
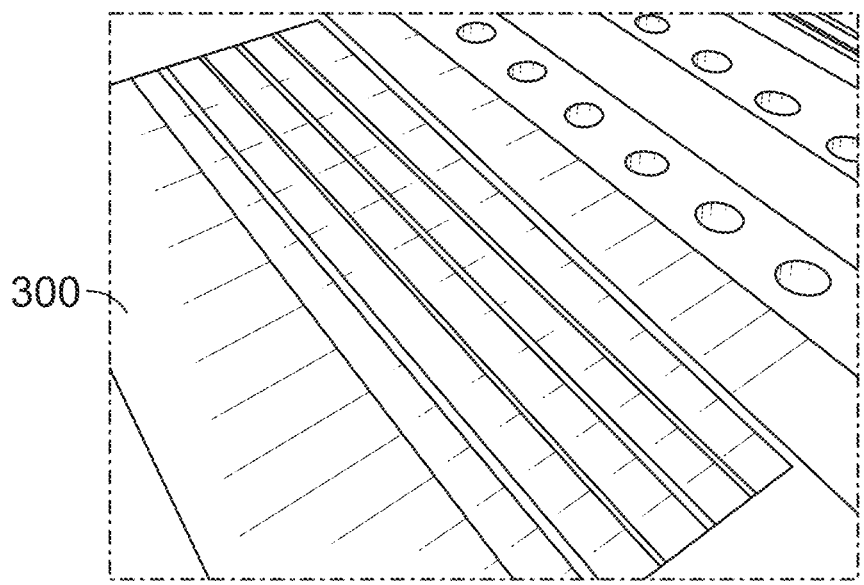
Figure 13C:
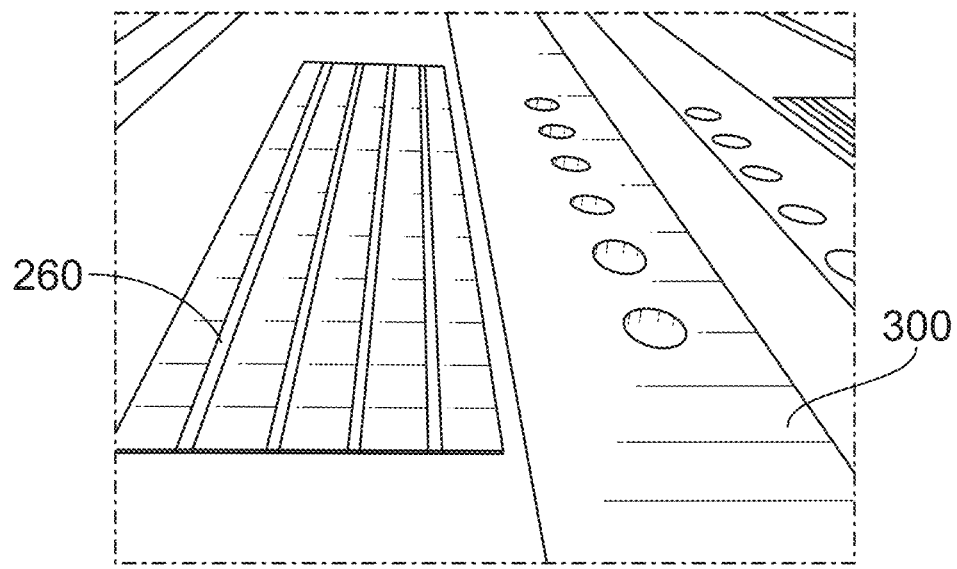

It will be appreciated that in other embodiments, the core inserts 260 may be laid out to be elongated in a direction transverse (e.g., horizontally as shown in FIG. 11) to the direction of lamination of the layers of the core panel 260 (e.g., vertically, as shown in FIG. 11). FIGS. 13A-13C are top plan and perspective views of an alternative exemplary core 300 of a sports board. FIGS. 13A-13C show an alternative exemplary incorporation of such core inserts 260 into a core 300. As will be noted from FIG. 13A-13C, the core inserts 260 are again oriented with the lamination direction extending horizontally relative to the sports board/core 300 (and thus the individual layers of the core insert extending vertically), but in this case the lamination direction extends transversely to the direction of elongation of the core 300. In this orientation, the core inserts 260, provide a stiffening effect, thereby increasing the liveliness and dynamic response of the board in the nose and providing impact resistance and durability under the binding area of the rear inserts.

Figure 14A:
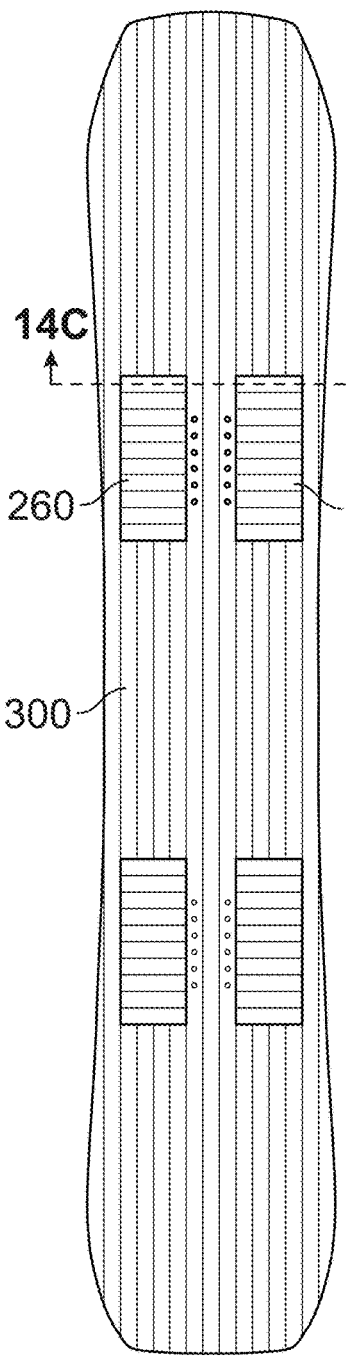
FIGS. 14A-14C are top plan, bottom plan, and cross-sectional views, respectively, of another alternative exemplary core of a snowboard, showing another alternative exemplary incorporation of exemplary full-depth core inserts into the exemplary core, in accordance with the present invention.
Figure 14B:
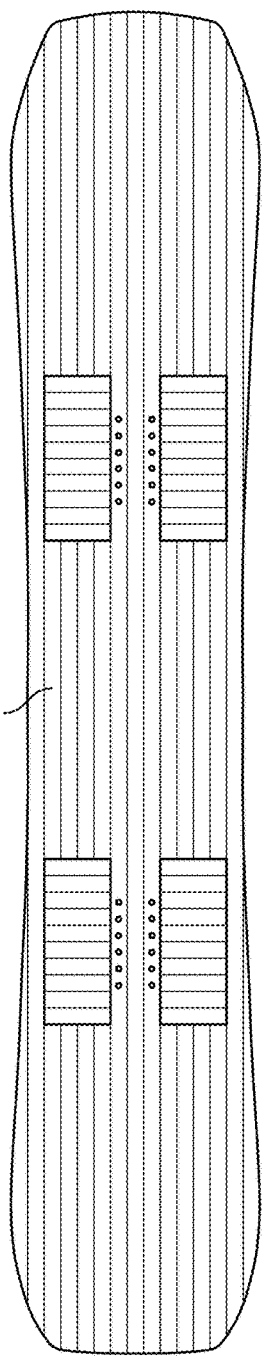
Figure 14C:
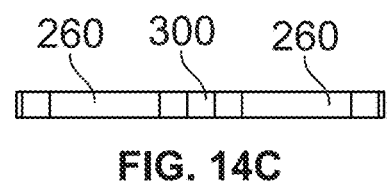

FIGS. 14A-14C are top plan, bottom plan, and cross-sectional views, respectively, of another alternative exemplary core 300 of a sports board including core inserts 260. In this embodiment, it is illustrated that the core panel 250 and core inserts 260 may be formed so that they will have a thickness (core panel 250) or height (core insert 260) that is the same as the height of the core 300 (or adjacent portion of the core 300). In such an embodiment, the core insert 260 may extend through the entire thickness of the core 300 as a full-depth core insert, as will be best appreciated from FIG. 14C. This arrangement may provide certain advantages in terms of stiffness, performance, etc. but also provide an additional advantage in that the core inserts 260 may be laid up with and among/between individual stringers of the core, as is typical of core construction. Accordingly, less stringer length (and therefore less virgin materials) may be used in the wood core, because of the volume occupied by the core inserts 260 within the core 300. In other embodiments, stringers may be laid up and bonded to form a complete core and then the core may be cut, milled, etc. to produce openings for receiving the core inserts 260. This may result in some waste of virgin materials (which may themselves be recycled) but also may result in reuse of reclaimed sports board materials to prevent them from accumulation in the environment as waste.

FIGS. 15A-15D are top plan, bottom plan, and cross-sectional views, respectively, of yet another alternative exemplary core 300 including core inserts 260. In this embodiment, it is illustrated that the core panel 250 and core inserts 260 may be formed so that they will have a thickness (core panel 250) or height (core insert 260) that is less than height of the core 300 (or adjacent portion of the core 300). In such an embodiment, the core insert 260 may not extend through the entire thickness of the core 300, but rather may extend only partially through the thickness as a partial-depth core insert, as will be best appreciated from FIG. 15C (inserts added to pockets open to the bottom surface of the core 300) and FIG. 15D (inserts added to pockets open to the top surface of the core 300). This arrangement may provide certain advantages in terms of stiffness, performance, etc. but also provides an additional advantage in that the core inserts 260 may be laid up with individual stringers of the core, as is typical of core construction, provided that stringers are provided with regions of reduced height in locations of the desired core inserts, to define pockets 310 for receiving those inserts 260. Accordingly, less stringer volume (and therefore less virgin materials) may be used in the core 300, because of the volume occupied by the core inserts 260 within the core 300 that would otherwise be occupied by stringers. In other embodiments, stringers may be laid up and bonded to form a complete core and then the core may be cut, milled, etc. to produce pockets 310 for receiving the core inserts 260. This may result in some waste of virgin materials (which may themselves be recycled) but also may results in reuse of reclaimed sports board materials to prevent them from accumulation in the environmental as waste.

The core inserts 260 may be incorporated into the sports board by applying epoxy, polyurethane glue or other adhesive to the core inserts and/or the associated portion of the sports board (e.g., core panel) during layup and assembly, for curing as part of the finished core or finished sports board, as discussed in greater detail below.

It should be noted that the core is well-suited for receiving the core inserts, as described in the example above, but that in other embodiments, the core inserts may be inserted in other layers, or may span not only the core layer but also other layers, in accordance with the present invention. Additionally, it should be noted that core inserts may be formed from materials other than used sports boards in accordance with the present invention. Further, it should be noted that core blocks may be formed of any desired materials, in any desired orientation, core panels may be cut in any desired orientation, and core inserts may be incorporated into the sports board in any desired orientation, to provide any desired material property, performance characteristic, or visual appearance effect, in accordance with the present invention.

Additionally, examples of core insert use in sports boards is illustrated in FIGS. 18A-20B, in the context of a core 300 layer for illustrative purposes. Additionally, it should be appreciated that the core inserts 300 may be provided oriented with any suitable lamination direction relative to the core/layer, and as either full-depth or partial-depth inserts, as discussed above. Further, it should be appreciated that the core inserts may be constructed of reclaimed materials or virgin materials (or a combination thereof), and that fewer than all of the steps described herein may be used for manufacture of a sports board in accordance with the present invention, e.g., some steps of the exemplary method for creating a reliable bond with reclaimed materials may not be required when virgin materials are used. Generally, these examples illustrate that the core inserts 260 may be positioned in any desired location relative to a sports board layer (e.g., core 300) to provide any desired aesthetic, functionality and/or performance effect.

FIGS. 18A-18L are top plan views of alternative exemplary cores 300 constructed to include core inserts 260 in accordance with alternative exemplary embodiments of the present invention. As shown in FIGS. 18A-18L, the core inserts 260 are positioned internally to edges of the core 300, e.g., by placement into suitable pockets defined internally to the edges of the core 300, or by layup among stringers in positions internal to the edges of the core 300.

FIGS. 19A-19F are top plan views of alternative exemplary cores 300 constructed to include core inserts 260 in accordance with alternative exemplary embodiments of the present invention. As shown in FIGS. 19A-19F, the core inserts 260 are positioned to extend to at least one edge of the core 300, e.g., by placement into suitable pockets defined to be open to an edge of the core 300, or by layup of the core inserts 260 among stringers during the fabrication of the core 300.

Figure 20A:
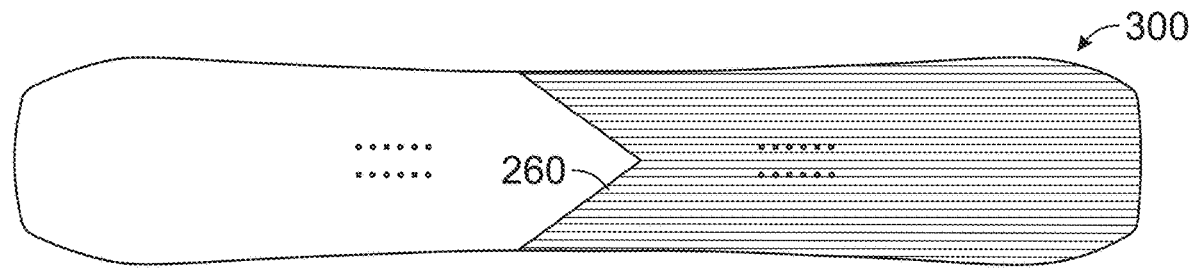
FIGS. 20A-20D are top plan views of alternative exemplary cores constructed to include core inserts extending fully between opposite edges of a core, in accordance with an alternative exemplary embodiment of the present invention.
Figure 20B:
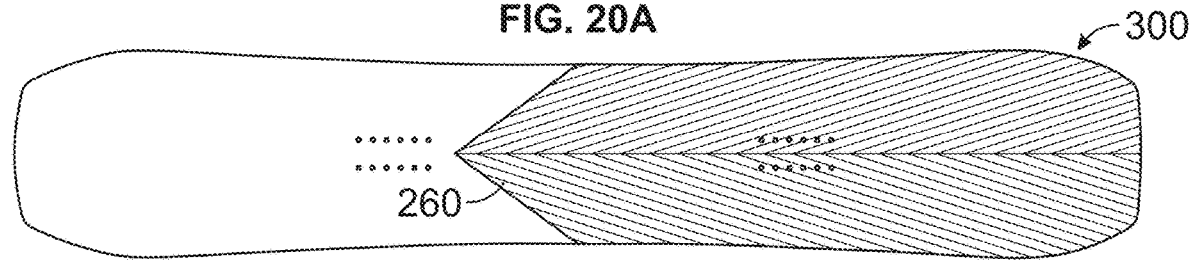
Figure 20C:
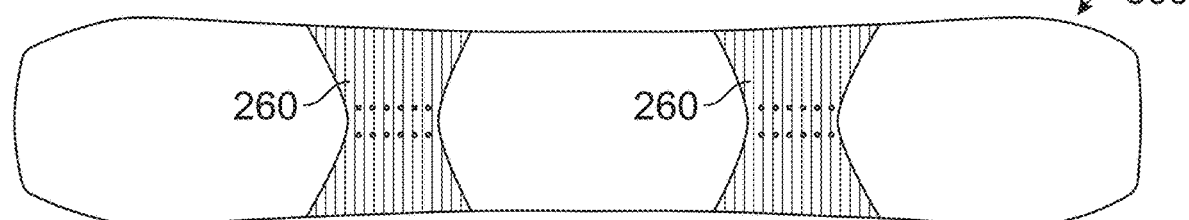
Figure 20D:
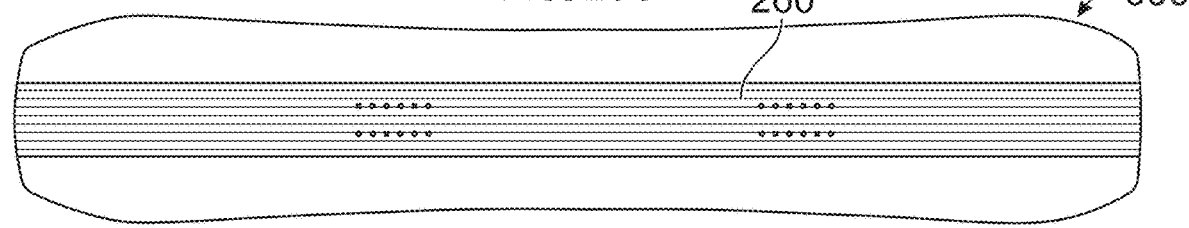

FIGS. 20A-20D are top plan views of alternative exemplary cores 300 constructed to include core inserts 260 extending fully between opposite edges of a core 300 (either transversely to a direction of elongation of the core 300, as shown in FIGS. 20A-20C, or in the longitudinal direction of elongation of the core 300, as shown in FIG. 20D), in accordance with alternative exemplary embodiments of the present invention. By way of example, this may be achieved by layup of the core inserts 260 among stringers during the fabrication of the core 300.

Figure 21A:
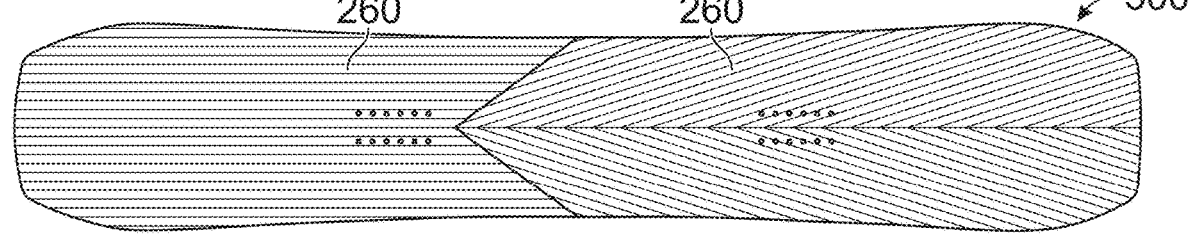
FIGS. 21A and 21B are top plan views of alternative exemplary cores constructed to include one or more core inserts forming an entire core layer, in accordance with another alternative exemplary embodiment of the present invention.
Figure 21B:
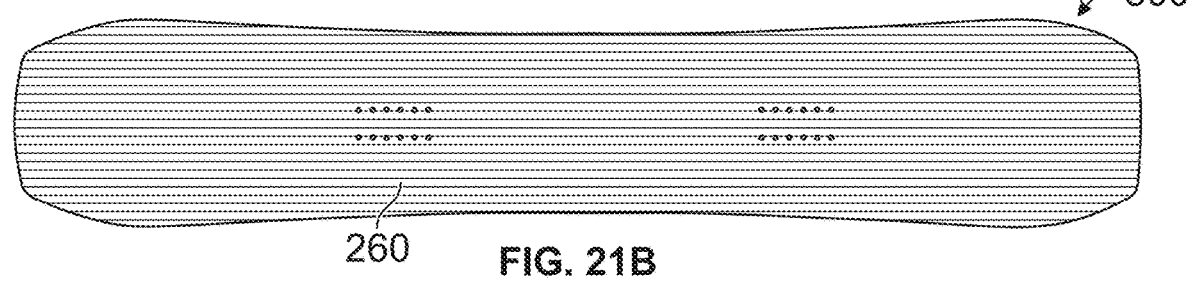

FIGS. 21A and 21B are top plan views of alternative exemplary cores 300 constructed to include one or more core inserts forming an entire core, in accordance with an alternative exemplary embodiment of the present invention. By way of example, this may be achieved by layup of the core inserts 260 without stringers during the fabrication of the core 300. Accordingly, the term "insert" is used in non-limiting fashion, as the present invention provides for fabrication of an entire core (or other layer) from core inserts.

Figure 16:
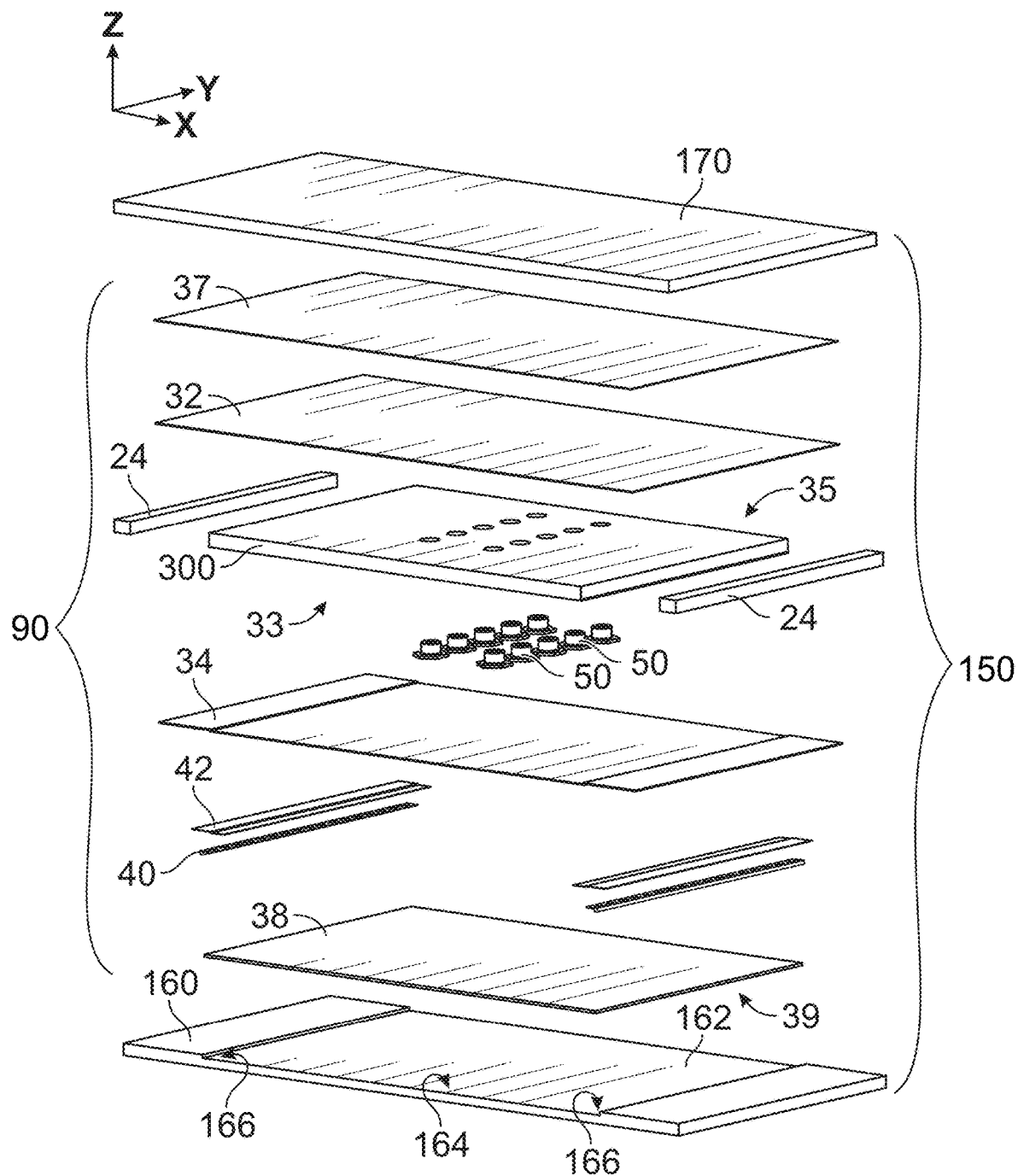
FIG. 16 is an exploded perspective view of the component elements of the exemplary snowboard of FIGS. 1-3, shown in relation to exemplary tooling for manufacturing the snowboard of FIG. 1.

In keeping with the foregoing example, FIG. 16 is an exploded perspective view of a partial portion of the component elements of the exemplary snowboard 100, including a core 300 including core inserts 260, shown in relation to exemplary assembly tooling 150 for manufacturing a snowboard assembly 90, which is post-molding, pre-finishing version of the snowboard 100. The assembly tooling 150 may be generally similar to conventional molding tooling, in that it may include a first/base portion 160 (cassette trap), and a second/cover portion 170 (cassette lid). As known in the art, the first/base portion 160 of the final assembly tooling 150 may be formed of metal, and may be generally sheet-like but may define a central cavity 162 having a bottom surface 164 dimensioned and shaped to form a snowboard assembly in a desired fashion. In the example of FIG. 16, the first/base portion 160 has a cavity 162 defined by a bottom surface 164 and sidewalls 166 spaced to correspond to the width of base sub-assembly (or the base layer 38 and edge members 40). Further, the exemplary bottom surface 164 is flat, but that in other embodiments, the bottom surface may be non-flat, e.g., concave or convex or otherwise non-flat, e.g., to provide a flat, camber, rocker or hybrid profile, etc.

As known in the art, the second/cover portion 170 may be formed of metal, and may be generally sheet-like. The second cover/portion 170 has a structure and surface configured adapted to produce a final/cured snowboard assembly having a desired configuration. The second cover/portion 170 may (or may not) define a central boss 172 dimensioned and shaped identically or complementarily (e.g., to allow for shaping, varying application of pressure, for pressure relief, or other purposes) to allow to the cavity 162 of the first/base portion 160, to form the final snowboard assembly 90 in the desired fashion.

As will be appreciated from FIG. 16, the snowboard 100 in accordance with the present invention includes multiple components/layers typically included in a conventional finished snowboard product, such as the base layer 38, bonding foil 42, edges 40, bottom reinforcement layer 34 (such as a fiberglass fabric or carbon fiber mat that is coated with adhesive then cured during formation of the final snowboard assembly), core 300, top reinforcement layer (such as a fiberglass fabric or carbon fiber mat that is coated with adhesive then cured during formation of the final snowboard assembly) and top sheet 37.

In this exemplary embodiment, as in conventional snowboard construction, the base layer 38 is first placed in the first/base portion 160 of the mold/cassette 160. This may involve first fitting the edge elements 40 to the sides of a sheet of polyethylene or other material intend to act as the base layer 38 of the finished snowboard, e.g., with the flange 40a of the edge members 40 overlying a portion of the peripheral edge of the base layer 38. The flange 40a provides mechanical attachment for the adhesive and fiberglass/other layer to grip onto and keep the edge attached to the pressed and cured base layer 38. The base layer 38 and edge members 40 are positioned within the cavity 162 of the first/base portion 160 of the tooling, with the edge members 40 abutting or in adjacent relationship with the sidewalls 166 of the first/base portion 160.

In this example, adhesive is then applied to the upper/top surface of the base layer 38 and edge members 40. Optionally, the bonding foil 42 is then applied over the members 40 (e.g., their flanges 40a) and the upper surface of the base layer 38.

The lower reinforcing layer 34 is also coated with adhesive. The lower reinforcing layer 34 is placed in the mold cassette 160 over the base layer 38, edge members 40, and foils 42.

Adhesive is then applied to coat and wet out the lower reinforcing layer 34. If desired, metal inserts, such as threaded metal inserts 50 may be inserted into corresponding openings defined in a core 300, e.g., for service as attachment points for shoe/boot bindings of the like, as shown in FIG. 16. Optionally, the core 300 may be prepared to join sidewalls 24 as part of the core prior to placement in the final assembly tooling. Alternatively, discrete sidewalls 24 may be inserted alongside the core 300 in the assembly tooling 150 (with appropriate application of adhesive), and may be joined to the core 300 and the rest of the layers during manufacture of the snowboard assembly 90, as will be appreciated by those skilled in the art.

If the core inserts 260 have not already been incorporated into to the core 300 as part of pre-assembly of the core 300, then the core inserts 260 may be added to the core 300 at this stage (either on the bottom side of the core, top side of the core, or through the entire thickness of the core, as appropriate), with adhesive applied to the openings in the core 300 and/or core inserts 260.

A bottom side 33 of the core 300 may then be wet/coated with adhesive, and the core 300 may be placed into the first/base portion 160 of the tooling 150, with the bottom side 33 positioned on the atop the bottom reinforcement layer 34.

Next, a top side 35 of the core 300 may be wet/coated with adhesive, and then the top reinforcement layer 32 is laid over the adhesive and core 300, preferably covering and overhanging the entire core 300. Accordingly, the top reinforcement layer 32 spans the cavity 162 of the first/base portion 160 of the tooling 150, and preferably extends beyond the cavity 162. Adhesive is then applied to coat and wet out the top reinforcement layer 32.

Figure 17:
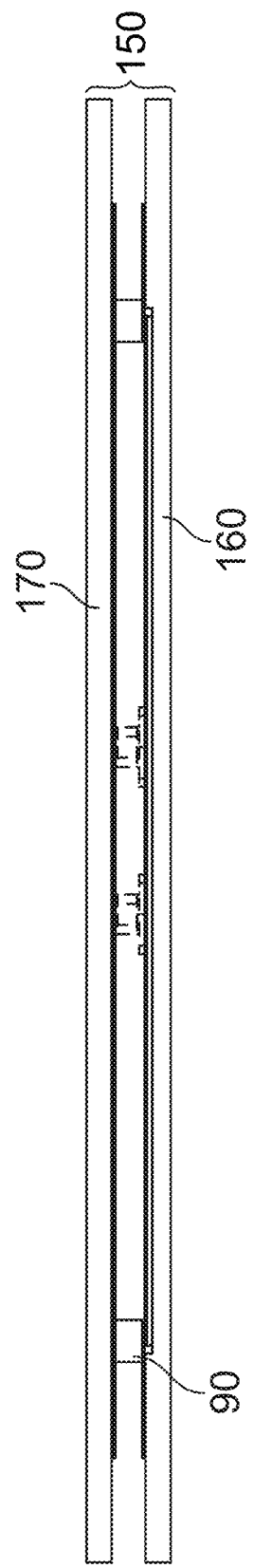
FIG. 17 is a cross-sectional view of the snowboard assembly 90 and tooling of FIG. 16.
Figure 18A:
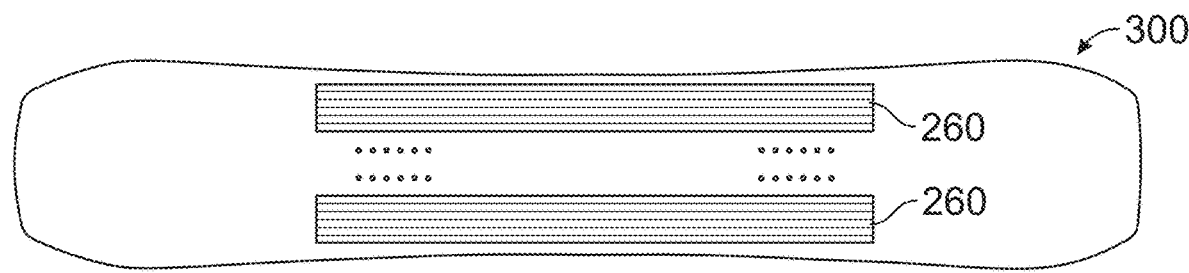
FIGS. 18A-18L are top plan views of alternative exemplary snowboard cores constructed to include core inserts in accordance with an alternative exemplary embodiment of the present invention.
Figure 18B:
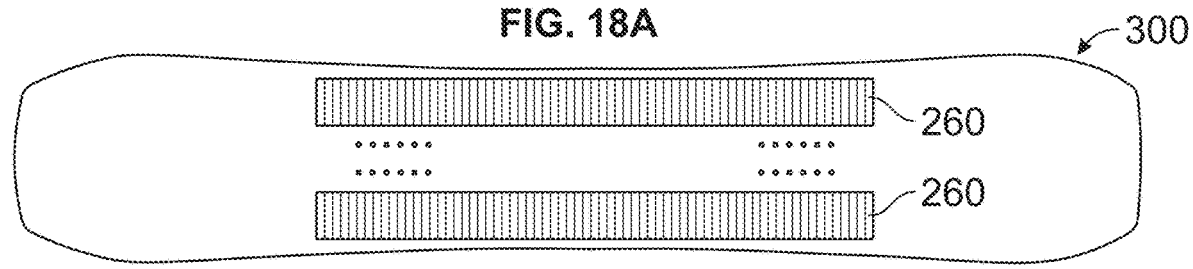
Figure 18C:
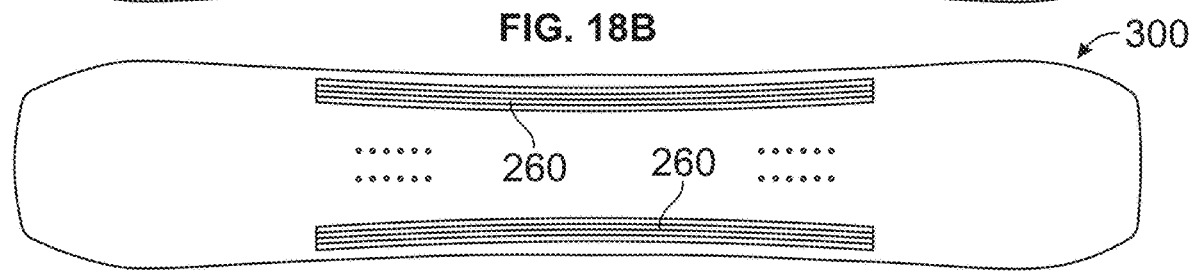
Figure 18D:
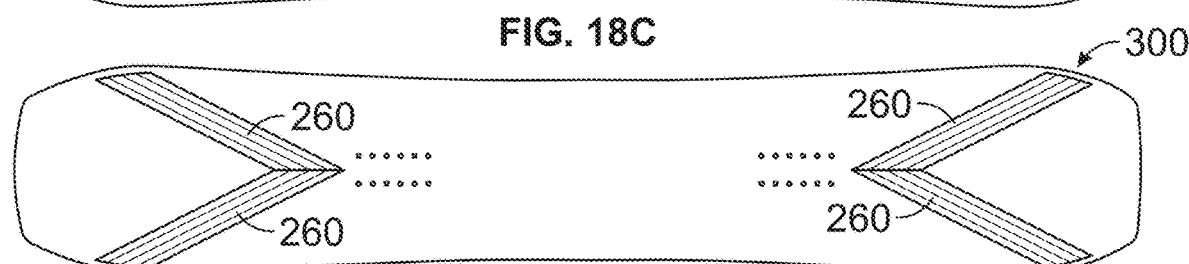
Figure 18E:
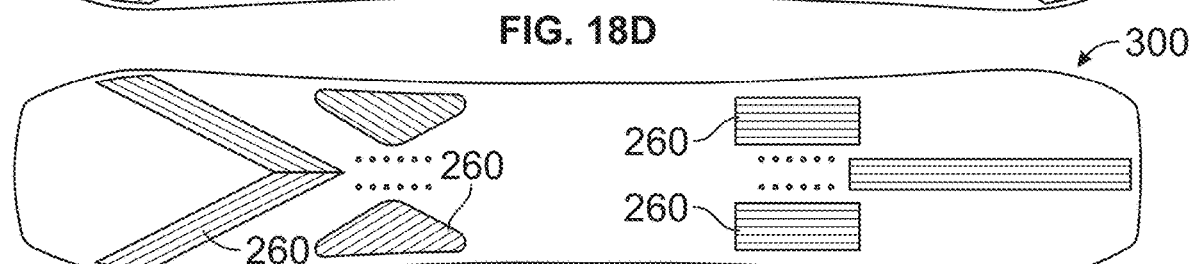
Figure 18F:
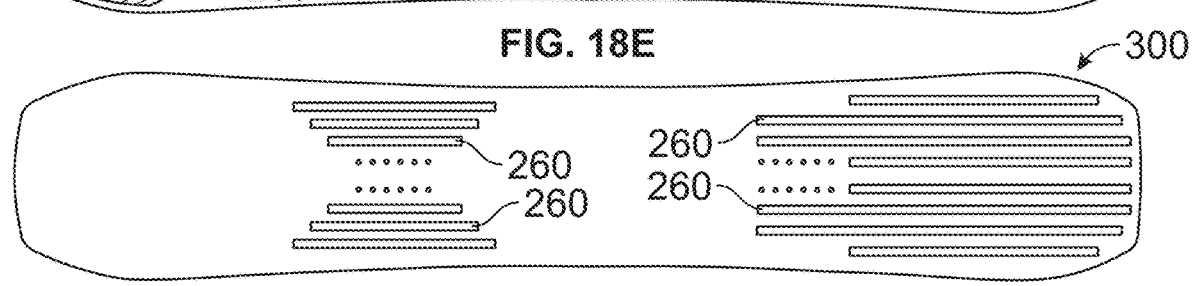
Figure 18G:
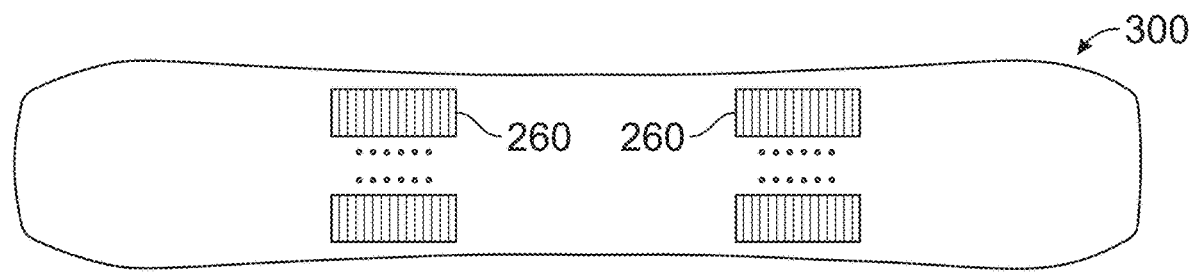
Figure 18H:
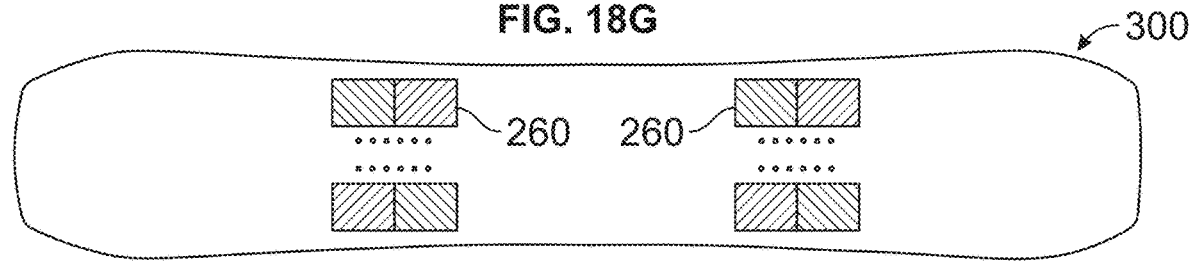
Figure 18I:
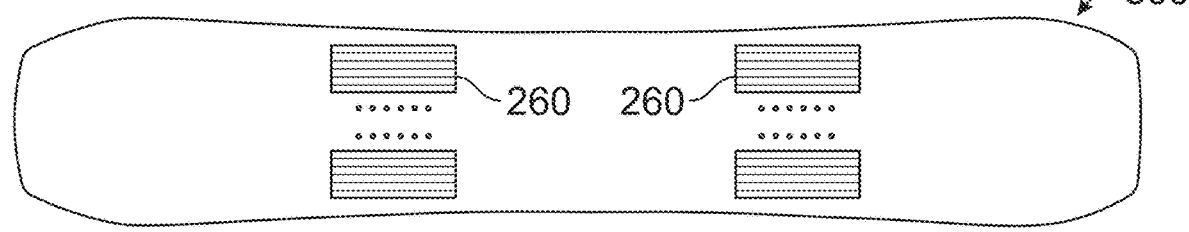
Figure 18J:
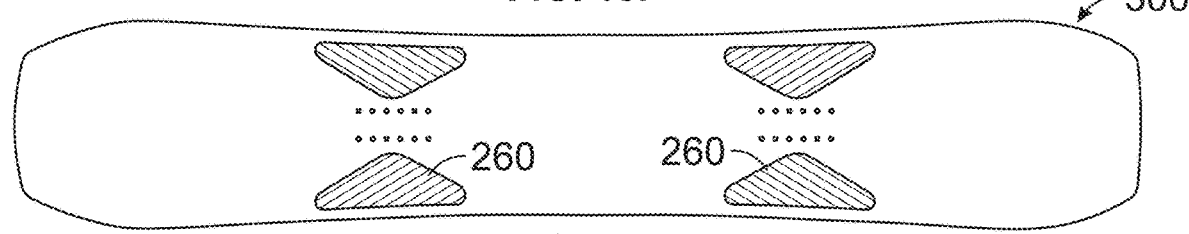
Figure 18K:
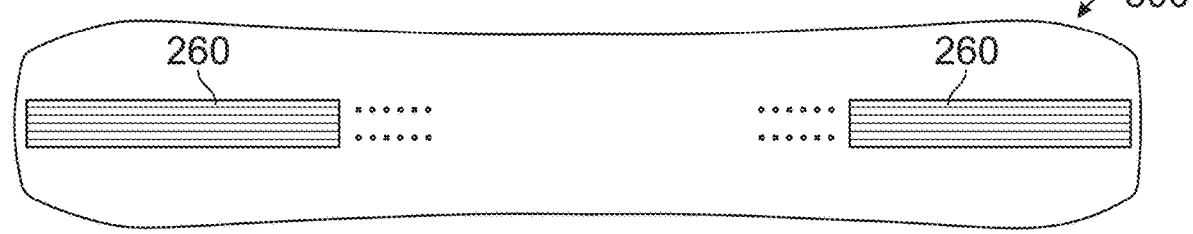
Figure 18L:
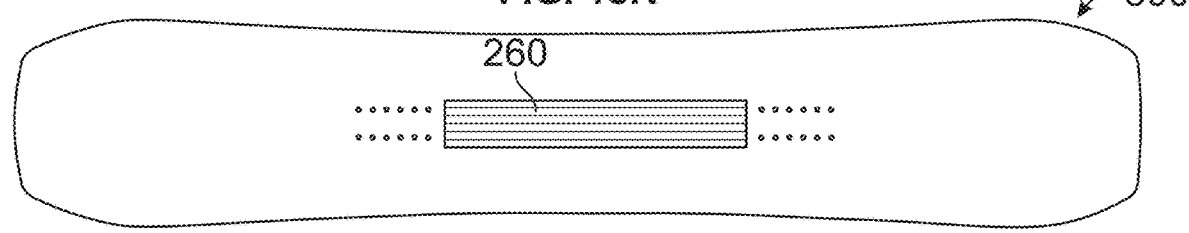
Figure 19A:
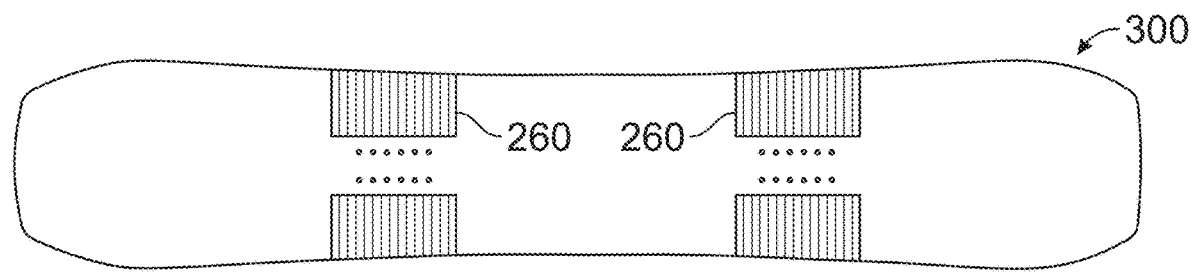
FIGS. 19A-19F are top plan views of alternative exemplary cores 300 constructed to include core inserts in accordance with other alternative exemplary embodiments of the present invention.
Figure 19B:
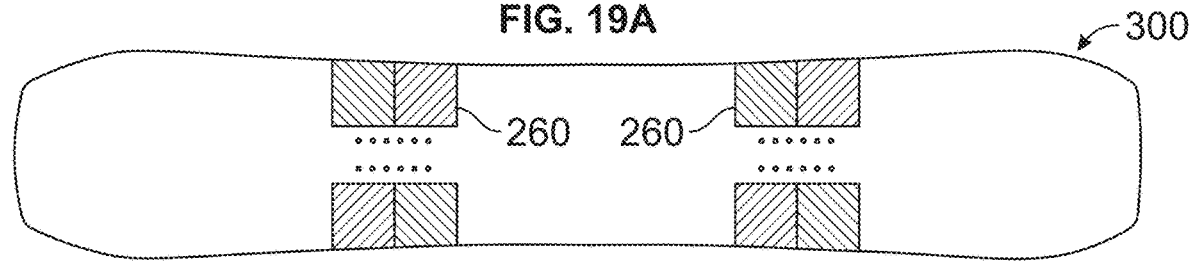
Figure 19C:
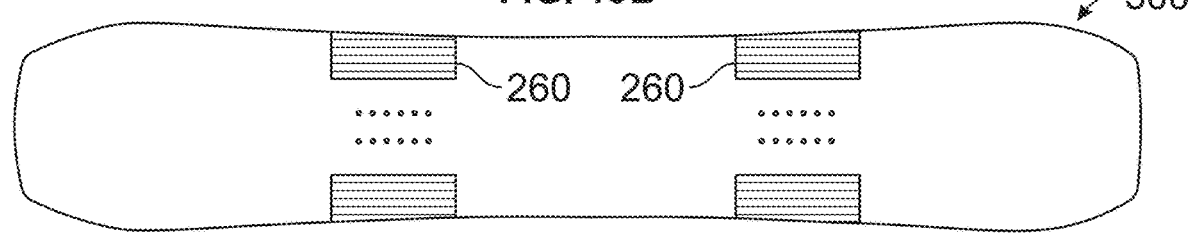
Figure 19D:
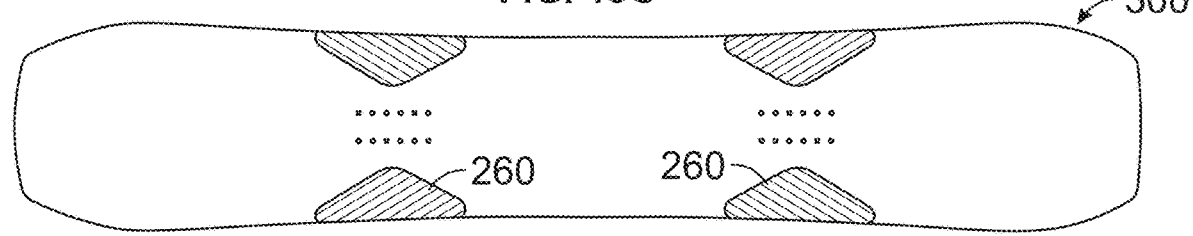
Figure 19E:
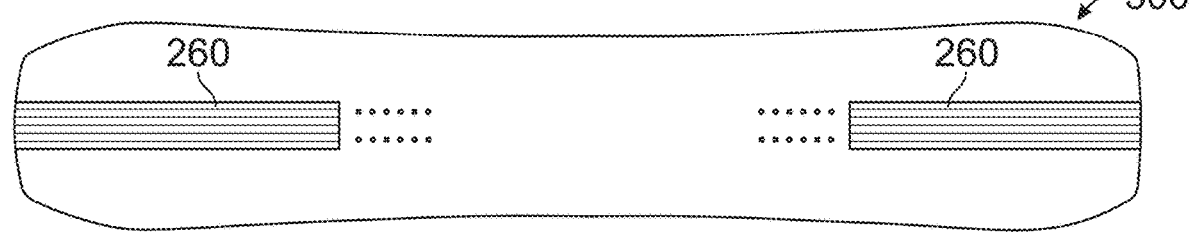
Figure 19F:
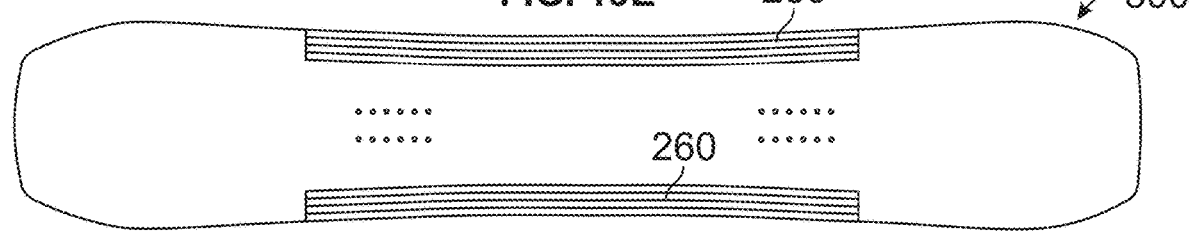

Next, the top sheet 37 is positioned to overlie the adhesive and top reinforcement layer 32, and then the second/cover portion 170 of the tooling 150 is mated to the first/base portion 160. This may or may not involve aligning a central boss of the second/cover portion 170 with the cavity 162 of the first/base portion 160 of the final assembly tooling 150. Optionally, the first and second portions 160, 170 may be taped together or otherwise be secured relative to one another. FIG. 17 is a cross-sectional view, showing the final assembly tooling 150 in a closed position, with the component elements of the final snowboard assembly 90 positioned within the final assembly tooling 150, between the first/base portion 160 and the second/cover portion 170.

The snowboard assembly 90, thus prepared, may then be molded in a conventional molding process for a suitable dwell time to allow the adhesive to cure, e.g., by placement of the entire molding tooling 150 thus prepared in a conventional press under elevated temperature and pressure in a conventional compression molding process.

Registration holes and pins may be used to promote proper alignment of the core 300, top sheet 37 and other layers, as known in the art, e.g., so that the edges 40 are properly positioned to be used as a guide for a band saw during trimming of the final pressed snowboard assembly. Additional layers of the fiberglass mat, etc. may be applied over the registration pins/sockets, or elsewhere, if additional strength is desired in these areas.

After the snowboard assembly 90 has been suitably cured, the snowboard assembly 90 may be removed from the assembly tooling 150. The snowboard assembly 90 may then be trimmed, e.g., using a band saw and following the edge members 40 and/or a by a CNC milling/routing machine, following a specific trimming/shape outline path, as appropriate, to form the finished snowboard 100. Additional conventional steps may also be performed at this time, such as sanding the snowboard around its perimeter, drilling/opening all inserts, cutting a sidewall angle, apply edge sealer, apply sidewall print graphics if desired, finishing the bottom surface to a desired surface consistency or shape, applying wax to the bottom surface 39 of the base layer 38, etc., to form the finished snowboard 100.

As mentioned above, the examples are provided herein for illustrative and non-limiting purposes only. By way of example, it should be appreciated that although the drawings illustrate an exemplary sandwich construction, in which full layers generally overlap other full layers of material, the present invention also encompasses other constructions, such as cap and semi-cap constructions in which one or more layers may overlie and surround the peripheral edges of one or more other layers.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A method for making a composite sports board assembly configured for a new multi-layer composite sports board, the method comprising the steps of:
  gathering a plurality of composite sports boards, each composite sports board of said plurality of composite boards comprising a plurality of bonded layers bonded together in a first lamination direction;

creating a block blank from said plurality of composite sports boards, the block blank comprising a plurality of slabs bonded together in the first lamination direction, each slab of said plurality of slabs comprising the plurality of bonded layers from one composite sports board of said plurality of composite sports, said plurality of slabs in the block blank being stacked in the first lamination direction with a respective layer of slab adhesive disposed between adjacent slabs of said plurality of slabs;

cutting said block blank in a direction crossing said plurality of slabs to form a core panel comprising a plurality of slab portions cut from the plurality of slabs;

cutting said core panel to form at least one core insert having a top surface and a bottom surface, wherein remaining slab portions of the plurality of slab portions within said core panel extend from said top surface to said bottom surface in said at least one core insert;

assembling a plurality of layers stacked in a second lamination direction with a lamination adhesive disposed between adjacent layers of said plurality of layers, said at least one core insert being assembled to span at least one of the plurality of layers; and curing said lamination adhesive to fix together said at least one core insert and said plurality of layers to form the composite sports board assembly.

2. The method of claim 1, wherein said creating said block blank comprising said plurality of slabs comprises:

stacking said plurality of composite sports boards in the direction of the first lamination direction, with the respective layer of slab adhesive disposed between adjacent composite sports boards of said plurality of composite sports boards;

curing said slab adhesive to laminate said plurality of composite sports boards; and cutting said plurality of composite sports boards bonded with cured slab adhesive to form said block blank comprising said plurality of slabs bonded together in the first lamination direction.

3. The method of claim 1, wherein said creating said block blank comprising said plurality of slabs comprises:

cutting each of said plurality of sports boards to form said plurality of slabs;

stacking said plurality of slabs in the direction of the first lamination direction, with the respective layer of slab adhesive disposed between adjacent slabs of said plurality of slabs; and curing said slab adhesive to laminate said plurality of slabs to form said block blank comprising said plurality of slabs bonded together in the first lamination direction.

4. The method of claim 1, further comprising finishing said composite sports board assembly to form the multi-layer composite sports board.

5. The method of claim 1, wherein said cutting said block blank in the direction crossing said plurality of slabs comprises cutting said block blank in the first lamination direction.

6. The method of claim 1, said assembling said plurality of layers stacked in the second lamination direction with the lamination adhesive disposed between adjacent layers of said plurality of layers comprises:

cutting at least one pocket in a core layer of said plurality of layers stacked in the second lamination direction; and positioning said at least one core insert in said at least one pocket.

7. The method of claim 1, said assembling said plurality of layers stacked in the second lamination direction with the lamination adhesive disposed between adjacent layers of said plurality of layers comprises:

laying up said at least one core insert among a plurality of stringers abutting said at least one core insert; and forming a core layer of said composite sports board assembly by curing the lamination adhesive to fix together said at least one core insert and said plurality of stringers.

8. The method of claim 1, said assembling said plurality of layers stacked in the second lamination direction with the lamination adhesive disposed between adjacent layers of said plurality of layers comprises:

orienting said at least one core insert with said first lamination direction of said at least one core insert extending transversely to said second lamination direction.

9. The method of claim 8, said assembling said plurality of layers stacked in the second lamination direction with the lamination adhesive disposed between adjacent layers of said plurality of layers comprises:

orienting said at least one core insert with said first lamination direction of said at least one core insert extending orthogonally to said second lamination direction.

10. The method of claim 1, wherein said gathering said plurality of composite sports boards comprises:

gathering used composite sports boards as the plurality of composite sports boards; and removing edges from each used composite sports board.

11. The method of claim 3, wherein said creating said block blank comprises:

performing a surface preparation process on said plurality of slabs or said plurality of composite sports boards to prepare said plurality of slabs to form an improved adhesive bond in the block blank.

12. The method of claim 11, wherein said performing said surface preparation process comprises:

performing a mechanical trenching surface preparation process to form a plurality of trenches mechanically disrupting a surface of each of said plurality of slabs, each trench extending through at least one outer layer to expose an inner layer susceptible to forming a reliable adhesive bond, wherein said at least one outer layer and said inner layer are among the plurality of bonded layers of each composite sports board.

13. The method of claim 12, wherein said performing said mechanical trenching surface preparation process comprises contacting said surface of each of said plurality of slabs with at least one circular saw blade.

14. The method of claim 12, wherein said performing said mechanical trenching surface preparation process comprises contacting said surface of each of said plurality of slabs with at least one of a router bit, angle grinding cutting wheel, a planer blade, a scraper, heated blades, a low-pressure water-jet, a sand blasting stream, a bead blasting stream, or a cutting head.

15. The method of claim 12, wherein at least one trench of said plurality of trenches extends non-linearly along said at least one outer layer.

16. The method of claim 11, wherein said performing said surface preparation process comprises:

performing a laser etching trenching surface preparation process to form a plurality of trenches mechanically disrupting a surface of each of said plurality of slabs, each trench extending through at least one outer layer to expose an inner layer susceptible to forming a reliable adhesive bond, wherein said at least one outer layer and said inner layer are among the plurality of bonded layers of each composite sports board.

17. The method of claim 16, wherein said performing said laser etching surface preparation process comprises directing laser output onto said surface of each of said plurality of slabs with a power of said laser output adjusted to penetrate said at least one outer layer.

18. The method of claim 17, wherein directing laser output onto said surface of each of said plurality of slabs comprises directing said laser output to form non-linear trenches.

19. The method of claim 11, wherein said performing said surface preparation process comprises performing at least one process selected from a group consisting of sanding, sand blasting, grinding, corona treatment, flame treatment, and acid etching.

* * * * *